United States Patent [19]

Alnuweiri

[11] Patent Number: 5,572,687
[45] Date of Patent: Nov. 5, 1996

[54] METHOD AND APPARATUS FOR PRIORITY ARBITRATION AMONG DEVICES IN A COMPUTER SYSTEM

[75] Inventor: Hussein Alnuweiri, Port Moody, Canada

[73] Assignee: The University of British Columbia, Vancouver, Canada

[21] Appl. No.: 409,658

[22] Filed: Mar. 24, 1995

Related U.S. Application Data

[63] Continuation-in-part of Ser. No. 231,310, Apr. 22, 1994.

[51] Int. Cl.$^6$ .................................................. G06F 13/374
[52] U.S. Cl. ................................................................ 395/303
[58] Field of Search .................................... 395/305, 298, 395/305, 300, 296, 303

[56] References Cited

U.S. PATENT DOCUMENTS

| | | | |
|---|---|---|---|
| 4,974,148 | 11/1990 | Matteson | 395/550 |
| 5,101,482 | 3/1992 | Kipnis | 395/298 |
| 5,111,424 | 5/1992 | Donald et al. | 395/292 |
| 5,131,085 | 7/1992 | Eikill et al. | 395/290 |
| 5,140,680 | 8/1992 | Best | 395/290 |
| 5,142,672 | 8/1992 | Johnson et al. | 395/500 |
| 5,195,185 | 3/1993 | Marenin | 395/303 |
| 5,239,651 | 8/1993 | Sodos | 395/729 |
| 5,241,601 | 8/1993 | Naito et al. | 395/732 |
| 5,241,628 | 8/1993 | Solari | 395/303 |
| 5,241,632 | 8/1993 | O'Connell et al. | 395/297 |
| 5,241,661 | 8/1993 | Concilio | 395/860 |

OTHER PUBLICATIONS

Shlomo Kipnis; Priority Arbitration with Busses; pp. 154–173, 1990.

*Primary Examiner*—Jack B. Harvey
*Assistant Examiner*—Xuong M. Chung-Trans
*Attorney, Agent, or Firm*—Oyen Wiggs Green & Mutala

[57] ABSTRACT

A bus-based apparatus and method for synchronous priority arbitration between modules in a computer system. The modules in the system have priority codes selected from the set $D(r,K+1)$ of r-digit radix K+1 numbers. Each stage in the arbitration method includes the steps of writing to a bus, performing a prefix-OR operation on the bus, and reading from the bus. Arbitration is completed in, at most, r units of time. The design of the system can be optimized for speed, logic per module, and/or the number of modules connected to any bus line. Both arbitration time and arbitration logic may be decreased by increasing the bus width. The number of modules can be increased indefinitely by increasing only bus-width, while keeping arbitration time and arbitration logic fixed. The arbitration bus is a wired-OR bus.

12 Claims, 12 Drawing Sheets

METHOD AND APPARATUS FOR PRIORITY ARBITRATION AMONG DEVICES IN A COMPUTER SYSTEM

CROSS REFERENCE TO RELATED APPLICATIONS

This application is a continuation-in-part of co-pending application Ser. No. 08/231,310 filed Apr. 22, 1994 entitled METHOD AND APPARATUS FOR PRIORITY ARBITRATION AMONG DEVICES IN A COMPUTER SYSTEM.

FIELD OF THE INVENTION

This invention relates to a method for arbitrating between modules in a set of modules which are competing to access a resource or to perform an operation in a computer system. The invention also relates to apparatus for providing synchronous arbitration logic according to the method of the invention.

BACKGROUND OF THE INVENTION

In a computer system it is common to have several modules which must compete for system resources. For example, a computer system may have several input output (I/O) devices each of which need to be serviced at various times by a processor. Sometimes more than one such module may require servicing at the same time. To operate efficiently when several modules are contending for access to a resource, the computer system must have some method for determining which of the modules to service first. The process of selecting one module from a set of modules which are competing to access a certain resource or to perform a certain operation is called "priority arbitration".

Distributed arbitration mechanisms employ an arbitration bus, comprising of a number of bus lines. Each module is connected to the bus and is assigned a unique arbitration priority. The arbitration priority of each module is represented by a unique priority code which, in general, can serve as an address for the module. The process of priority arbitration identifies the contending module with the highest priority so that that module can be given first access to the resource.

During arbitration, each module applies logic values which identify the module to the arbitration bus. The logic values applied by a particular module are determined by the priority code of the module and the logical state of the bus. After a delay, the logic values on the bus uniquely identify the contending module with the highest priority. This delay is determined by several factors including the delay through the logic components of arbitration logic as well as the time needed by the bus line to settle to a stable (binary) state.

Two major types of distributed priority arbitration mechanisms are: synchronous arbitration, which uses clocked arbitration logic; and asynchronous arbitration, in which the arbitration process is carried out by propagating signals through various stages of logic components and wires without using a global clock. Asynchronous arbitration schemes must ensure that the arbitration process is purely combinational with no feedback. In asynchronous arbitration schemes the arbitration bus and the arbitration logic of the modules connected to it must form an acyclic circuit. Feedback paths may introduce metastability and indefinite postponement of arbitration.

Taub, *Contention-resolving Circuits for computer Interrupt Systems* Proceedings of the IEEE, Vol 23., No. 9, September, 1976, pp. 845–850 describes a distributed priority arbitration technique. Taub's mechanism is asynchronous and requires a bus of width $K=\log_2 N$ bits to arbitrate among N modules in K units of bus-settling time. This arbitration scheme has gained popularity and is used in many modern bus systems, such as Futurebus+, M3-bus, S100 bus, Multibus-II, Fastbus, and Nubus.

Kipnis, U.S. Pat. No. 5,101,482 describes an asynchronous priority arbitration system. The Kipnis system provides a trade-off between bus width (i.e. the number of bus lines in the bus) and arbitration time (i.e. the number of iterations needed to resolve contention). This trade-off is achieved by selecting the priority codes from a special group of code words which Kipnis calls "binomial codes". The number of 1-bits in a binomial code is not fixed and is often comparable to the length of the binomial code.

When the binomial codes have a length in bits equal to the number, K, of bus lines and the maximum number of intervals of consecutive 0-bits or consecutive 1-bits in the binomial codes (disregarding leading 0-bits) is t then the arbitration can be completed in t units of bus settling time. With the Kipnis system the number N of modules that may be connected to an arbitration bus is given by:

$$N \leq \sum_{q=0}^{t} \binom{K}{q} \quad (1)$$

where $\binom{K}{q}$ denotes the binomial factor $\frac{K!}{q!(K-q)!}$.

Other general discussions of asynchronous and synchronous arbitration schemes can be found in Kipnis, *Priority Arbitration with Buses*, Proceedings if the MIT Conference on Advanced Research in VLSI, Cambridge Mass., 1990, pp 154–173 and Andrews, *Enhancing the Performance of Standard Buses*, Computer Design, September, 1991.

In prior art arbitration systems, the number of elementary components in a module's arbitration logic is proportional to the bus-width K. Furthermore, in many prior art systems, each module is connected to all bus lines (i.e. the number of bus lines connected to each module is K, and the number of modules per bus line is N). This reduces the performance of prior art arbitration systems because, in general, a bus line which is connected to many modules takes longer to settle to a steady state after it has been written to than a bus line which is connected to fewer modules. Other limitations of many prior art priority arbitration systems are: the design of the arbitration hardware depends upon bus width and, in some cases, the number of modules connected to the bus; and the fan-in of certain logic gates in the systems can be as large as the bus width. This is undesirable because logic gates with a large fan-in tend to be slower than equivalent logic gates with a smaller fan-in. While prior art systems can be designed with multi-level logic circuits to reduce fan-in to acceptable levels the propagation delay through such multi-level circuits is still a function of bus width.

SUMMARY OF THE INVENTION

This invention provides an improved method of priority arbitration among contending modules in a computer system comprising N modules $M_j$, with $1<j<N$, and a bus for priority arbitration between the modules. The bus comprises a plurality of K bus lines bus{1}, bus{2}, ..., bus{K}. Each module is identified by a unique priority code $P_j$. The invention improves on the performance, simplicity and/or flexibility of existing priority arbitration schemes by providing synchronous priority arbitration in which a prefix-OR operation is carried out on the bus before contending modules read from the bus to determine if a module of higher priority is in contention.

One embodiment of the invention provides a method for priority arbitration among a plurality of modules in a computer system. The computer system comprises a multi-line arbitration bus having K bus lines bus{1}, ..., bus{K}. The method comprises the steps of: assigning to each module a priority code $P_j$ from the set $D(r,K+1)$ of r-digit radix K+1 numbers; causing modules which are contending for access to a system resource to be active; causing each active module having a priority code with a non-zero first digit, to write a logic value of "1" to a bus line bus{i} corresponding to the first digit of the module's priority code; performing a prefix-OR operation on the arbitration bus; and, for each active module having a priority code with a first digit equal to i, where i<K, reading a logic value on a bus line bus{i+1} and making the active module inactive if the logic value on bus line bus{i+1} is "1". In a preferred embodiment, the steps of writing to a bus line, performing a prefix-OR operation, and reading from the bus are iterated for subsequent digits of the priority codes until only a single module remains in contention. This embodiment of the invention provides synchronous arbitration and requires r steps in the worst case.

In a variant of the method of the invention, the step of performing a prefix-OR operation on the arbitration bus comprises causing each of the active modules having a priority code with a non-zero first digit to write logic values of "1" to bus line bus{i}, where i is the value of the non-zero digit of a module's priority code, and to any bus lines bus{j} where j<i.

An alternative embodiment of the invention provides a method comprising the steps of:

a) Selecting codes $P_j$ from the set $B(K,r)$ of bounded weight codes of length K and maximum weight r;

b) setting each bus line bus{i} to a 1 logic state if, in any contending module, bit $\rho_i^{(j)}=1$, where $\rho_i^{(j)}$ is defined as set out below;

c) performing a prefix-OR operation on the bus;

d) reading the bus and removing module $M_j$ from contention if (l<r AND $P_j\{1\}=0$ AND q=k+1 AND bus{1}=1) OR ($\rho_q$<m AND $P_j\{\rho_q+1\}=0$ AND bus{$\rho_q$+1}=1) where l is the weight of code $P_j$; k is the number of 1-intervals in the code $P_j$; and q is the number of times that said steps (b) and (c) have been executed; and e) iterating steps (b), (c) and (d) until only a single module remains in contention.

Another aspect of the invention provides a computer system comprising: a plurality, N, of modules $M_j$; a wired-OR bus for priority arbitration between the modules; prefix-OR means operatively associated with the bus for transforming the state of the bus by switching all bus lines which are lower in order than any bus line which is in a logic 1 state to a logic 1 state; writing means associated with the modules for writing to the bus; reading means associated with the modules for reading from the bus; and logic means in each module associated with the reading means for switching the module into a non-active state conditionally upon values read by the reading means. The bus comprises a plurality of bus lines bus{1}, bus{2}, ..., bus{K}. Each of the modules has a unique priority code $P_j$. Each of the modules is switchable between an active state and a non-active state.

BRIEF DESCRIPTION OF THE DRAWINGS

In drawings which illustrate specific embodiments of the invention, but which should not be construed as restricting the spirit or scope of the invention in any way.

DETAILED DESCRIPTION OF THE PREFERRED EMBODIMENT

Figure 1:
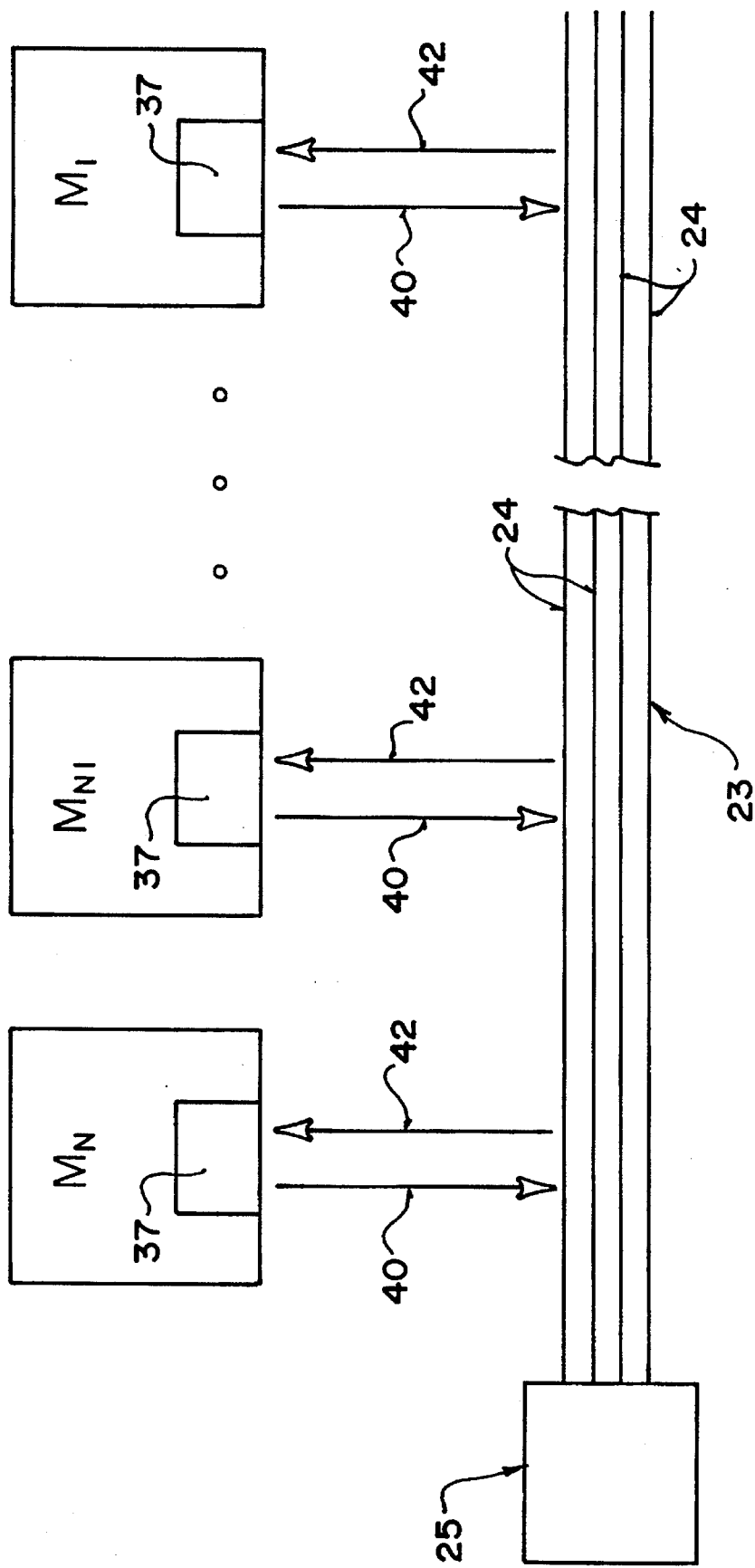
FIG. 1 is a block diagram of a computer system comprising a number of modules connected to a bus according to the invention.

As shown in FIG. 1, the invention provides for arbitration between a number (N) of modules $M_j$ (1≤j≤N) connected to an arbitration bus 23. Modules $M_j$ may be processors in a multi-processor computer system, peripheral or other I/O devices, or other devices in a computer system which compete for shared resources. An arbitration procedure is required because several modules $M_j$ may request simultaneous access to the same shared resource and the shared resource may not be able to service all of the modules at one time. The arbitration procedure determines which of the modules $M_j$ which are contending to access a resource will be permitted first access to the resource.

Each module $M_j$ has a predetermined module priority which is encoded as a binary code $P_j$ unique to that module. Any group of codes $P_j$ can be ranked in order. The purpose of the arbitration procedure is to permit access to the shared resource by the module $M_j$ with the highest priority $P_j$. Each module $M_j$ has associated with it module arbitration logic 37. Modules $M_j$ are interconnected with bus 23 by write lines 40 and read lines 42, as discussed below.

Arbitration bus 23 comprises K bus lines 24. A prefix-OR unit 25, the operation of which is described below, is connected to arbitration bus 23. Arbitration bus 23 is constructed so that each bus line 24 carries the logical OR of the bits written on it. Each bus line 24 remains at logic level 0 unless one or more modules write a logic 1 value on it, in which case the bus line carries a logic 1 value. The state of bus 23 can be represented by a K-bit binary word, BUS. Each of the K bits of BUS corresponds to the logic state of a corresponding one of bus lines 24. Individual bus lines 24 are designated as bus{i}, where $1 \leq i \leq K$.

Where bus 23 has K bus lines 24, codes $P_j$ are preferably selected from the set D(r, K+1) of r digit radix (K+1) numbers. This set comprises $(K+1)^r$ different code words. Therefore, a maximum of $(K+1)^r$ modules can be attached to a single bus 23.

Each of the r digits $d_{r-1}, d_{r-2}, \ldots d_0$ in a r-digit radix (K+1) number can be represented as a K+1 bit unitary binary number in which only one bit is non-zero. For example, if K=7, the digit "5" can be represented as 00100000 and the digit "0" can be represented as 00000001. However, a somewhat more efficient scheme can be achieved by representing each digit using a K-bit minimal unitary code $Z(d_j)$ in which one bit is non-zero if and only if the digit $d_j$ is non-zero and all of the bits are zero if the digit has a value of zero. If K=7 then Z(5)=0010000 and Z(0)=0000000. In this application radix K+1 digits are represented by K-bit minimal unitary codes unless otherwise specified.

Figure 2:
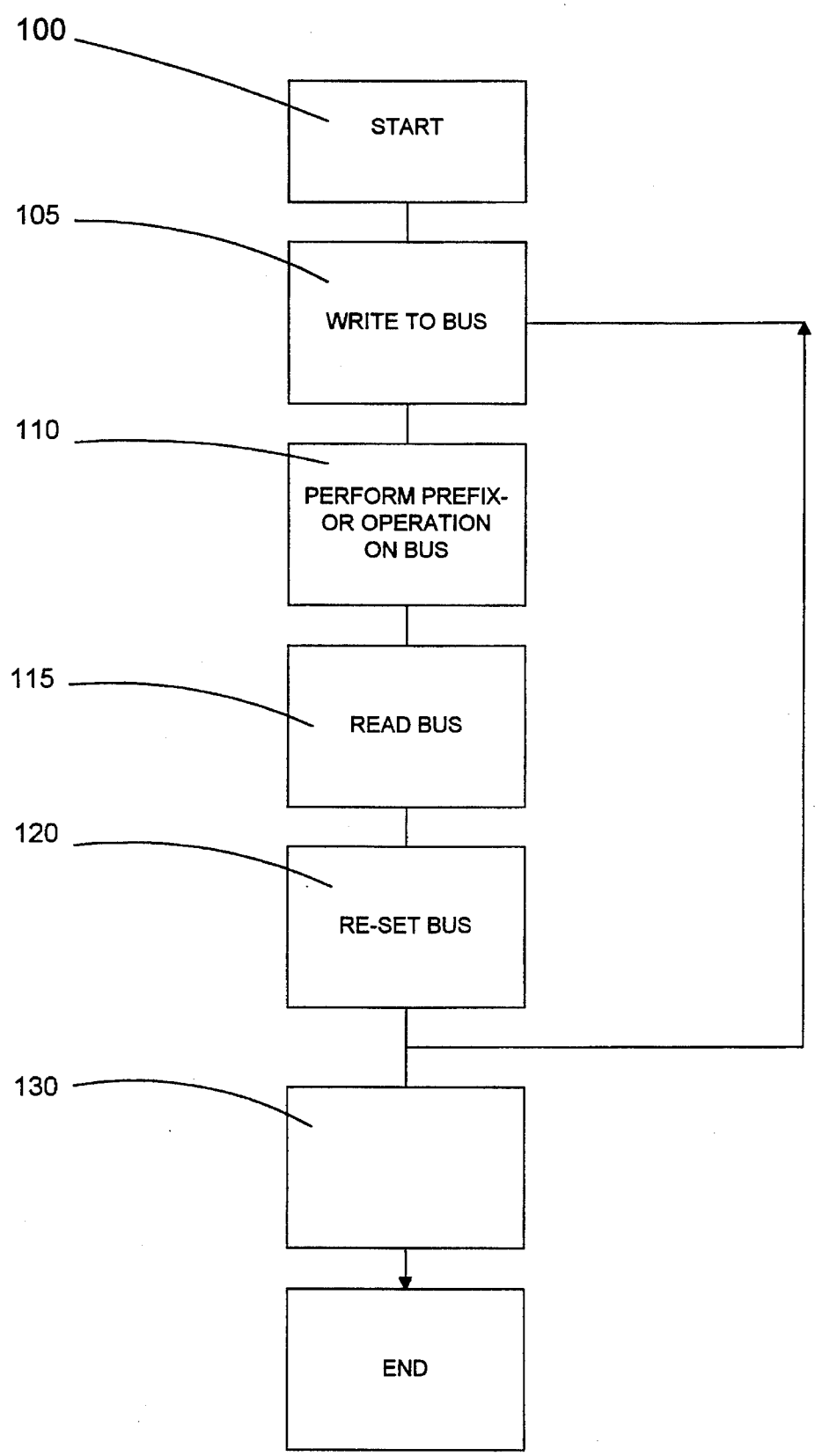
FIG. 2 is a flow chart for the method of arbitration according to the invention.

The arbitration process operates as shown in FIG. 2. When the arbitration process begins, at 100, each module $M_j$ has been assigned a code word $P_j \in D(r,K+1)$. Each module $M_j$ has an ACTIVE flag. In step 100 the arbitration is triggered by a START signal which is generated by the computer system. At the end of step 100, the contending modules have their ACTIVE flags set and all of bus lines 24 have a logic level of 0. Non-contending modules $M_j$ which are not requesting access to the resource may also be connected to bus 23. These non-contending modules $M_j$ do not have their ACTIVE flags set and do not take part in the arbitration process.

The arbitration process loops through steps 105 through 120 until the contending module with the highest priority code $P_j$ has been uniquely identified. The number of the current iteration is represented by q, q=1,2, . . . r. A maximum of r iterations of steps 105 through 120 is needed to uniquely identify the contending module with the highest priority code $P_j$.

As described below, during each iteration some contending modules may be removed from contention and will have their ACTIVE flags set off. These modules become inactive and do not take part further in the arbitration. We define $A_q$ to be the set of modules $M_j$ remaining in contention after the $q^{th}$ iteration of the arbitration procedure. $A_0$ is the initial set of contending modules $M_j$. Similarly, $A_1, A_2 \ldots A_q \ldots A_r$ are the sets of modules remaining in contention after the first, second, and successive iterations of steps 105 through 120.

In step 105, each module $M_j$ writes the first digit $d_{r-1}$ of its code $P_j$ onto bus 23. After the first iteration of step 105, BUS has the value $d^{r-1}{}_{(1)}$ OR $d_{r-1}{}^{(2)}$ OR . . . OR $d_{r-1}{}^{(j)}$ where the superscript j ranges over all of the modules in the set $A_0$. Unless the first digit of the codes for all of the contending modules is 0 at least one bit of BUS will have the value 1.

Next, in step 110, a prefix-OR operation, represented by H(BUS), is performed on bus 23. The prefix-OR operation maps BUS, a K bit binary word representing the state of bus 23, onto a corresponding K bit sorted code and then writes the sorted code onto bus 23. For example, if bus 23 has 6 bus lines 24 and, after step 105 BUS has the value 001010 then, after the prefix-OR operation in step 110 BUS will have the value 001111.

A sorted code is a binary word in which all of the 1-bits are consecutive and occupy the least significant positions in the binary word. For example, 000001111 is a sorted code. The notation S(K) will be used to denote the set of all sorted code words of length K. The set S(K) has K+1 members including $0^K$ and $1^K$, where $0^K$ and $1^K$ represent words made up of K consecutive 0's and K consecutive 1's respectively. The individual codes which are members of S(K) are designated as $S_t$ where t is the number of 1-bits in the code. For example, $S_3(8)$=00000111.

The prefix-OR transformation is defined as follows:

$$BUS \rightarrow H(BUS)=S_t(K) \Leftrightarrow t=\lambda_K(BUS) \qquad (4)$$

$\lambda_K(BUS)$ is a function with an integer value that returns the position of the highest order 1-bit in the binary word BUS, as counted from the lowest order bit of BUS. For example, if BUS=001010001, then H(BUS)=001111111=$S_7(9)$, $\lambda_K(BUS)$=7.

After the prefix-OR operation in step 110, which may be performed simultaneously with writing step 105, comes a first reading Step 115. During step 115 each module $M_j$ reads bus 23 to determine whether any module with a higher priority has written to bus 28 in the most recent iteration of step 105. If so, then module $M_j$ removes itself from contention (i.e. turns its ACTIVE flag off). If not, then the module remains in contention. In step 115 each module reads the bit one higher in order than the bit that it wrote to bus 23 in step 105. Because of the prefix-OR operation of step 110, the bit read in step 115 will be a "1", if and only if another module wrote a higher digit to bus 23 during step 105.

Bus 23 is re-initialized in step 120. Steps 105 through 120 are then repeated with each module which remains in contention applying the next digit of its code to bus 23.

Assuming that no two modules share the same code, this arbitration process will always end with only a single module $M_j$ remaining in contention after, at most, r iterations of steps 105 through 120. In step 130 the "winning" module (i.e. the sole member of set At) may write a word onto bus 24 to identify itself to the computer system. The computer system can then use the value on bus 24, in conventional ways, to permit the winning module to access the shared resource.

The arbitration process can be summarized by the following pseudo-code, in which text following a % sign is a comment:

PROCEDURE ARBITRATE

% the following procedure is performed synchronously by
% each active module $M_j$.

```
100 begin
if j ∈A₀ then ACTIVE(j)←1      % set the ACTIVE flag if
                                % M_j is a contending module
for k=r−1 down to 0 do % for q=1 to q=r
    begin
    105.  if d_k ≥ 1 then write a 1 on bus {d_k};
    110.  perform prefix-OR operation on bus 23;
    115.  if d_k+1 ≤ K then read bus {d_k+1};
          if bus {d_k+1} = 1 then ACTIVE (j)←0;
    120.  initialize bus 23;
    end
```

-continued

130. Upon completion of the arbitration procedure, only the module with the highest priority remains active. This module can then write its priority code on bus 23, if needed.
end Procedure ARBITRATE consists of, at most r iterations. In the $q^{th}$ iteration all competing (active) modules $M_j$ examine the $q^{th}$ digit of their priority code $P_j$. Only those modules with the maximum such position remain active.

Where a D(r,K+1) coding scheme is used then the procedure ARBITRATE takes, at most, r units of time (where a unit of time is the time required to complete one iteration of steps 105 through 120). In general, the major portion of each unit of time is the time taken for bus 23 to settle to a stable state after write step 105. The bus settling time also includes the propagation delay through prefix-OR unit 25. However, as described below, there need be only a single prefix-OR unit 25. Therefore, the performance of prefix-OR unit 25 may be optimized by the use of look-ahead techniques and powerful bus drivers which would be too expensive to include in logic 37 in each module.

Figure 3:
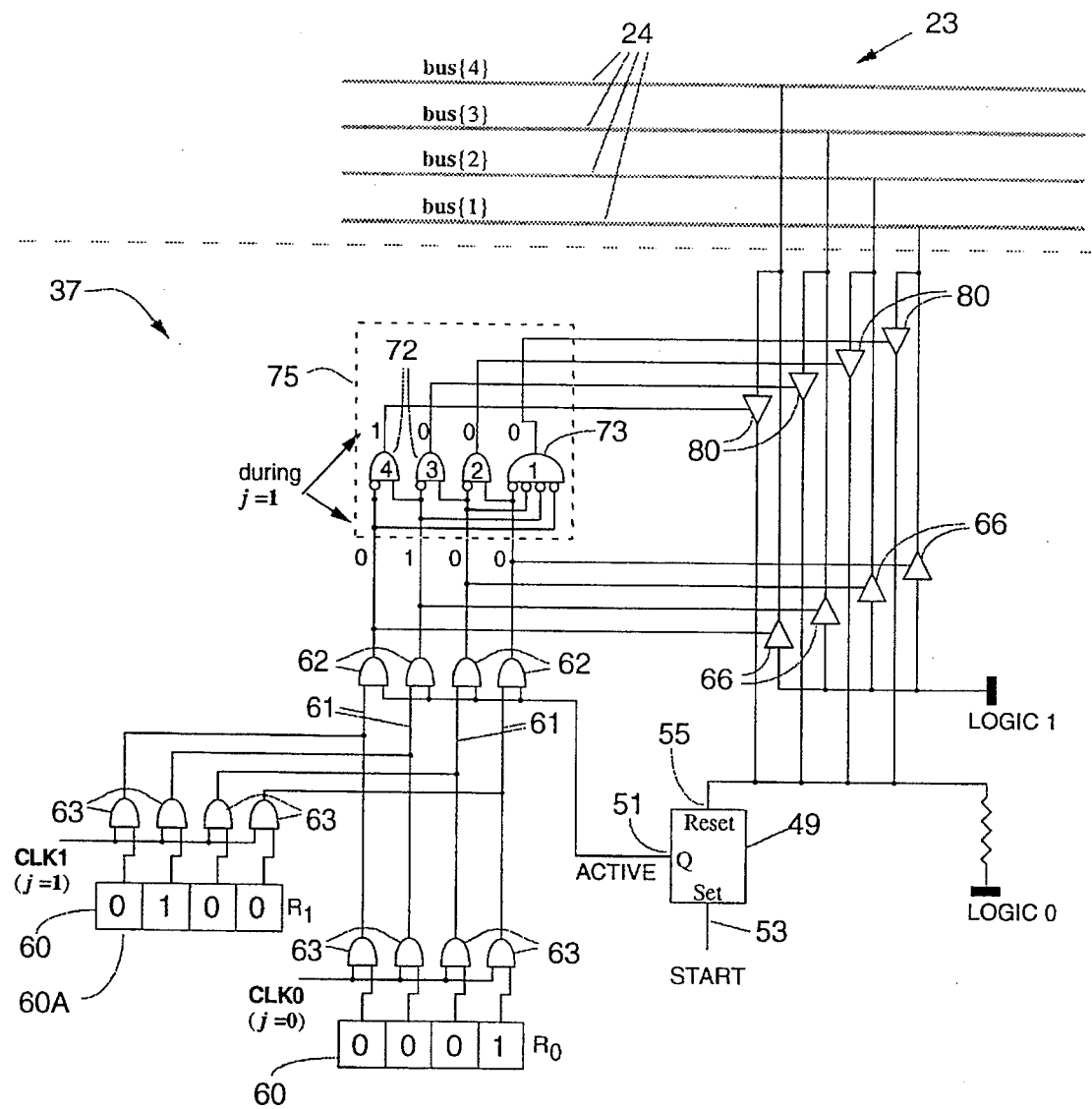
FIG. 3 is a schematic diagram showing one form of module arbitration logic circuitry according to the invention.

FIG. 3 is a simplified schematic diagram of a preferred form for the arbitration logic 37 for a single module connected to bus 23. There are many alternative circuits which could be used to practice the invention. Arbitration logic 37 comprises a latch 49 with an output 51 which serves as an ACTIVE flag. When a START signal 53 is applied to the SET input of latch 49 then output 51 is switched to a logic "1", state.

The START signal may be generated, for example, by one of modules $M_j$ when that module needs to access a shared resource. The module may transmit a request signal on a control line (not shown). The request signal generated by module $M_j$ results in the issuance of a START signal 53 after the completion of some intermediate steps. The START signal is applied to latch 49 through a gate (not shown) so that latch 49 is set only if the module requires access to the shared resource.

Latch 49 also has a reset line 55. Output 51 remains in its logic "1", state (i.e. the ACTIVE flag remains set) as long as the signal at reset line 55 remains in a logic "0" state.

Arbitration logic 37 also comprises a set of r, K-bit registers 60 to store the individual digits of the priority code $P_j$ for the module. By means of selector circuitry, which in the circuit of FIG. 3, comprises two groups of AND gates 63, wherein each group of AND gates 63 is clocked by one phase, CLK0 or CLK1, of a two-phase clock so that the K output lines 61 of a selected one 60A of registers 60 are each connected to one input of one of K, 2-input, AND gates 62. Other types of selector circuitry which achieve this result may also be used. Only one of registers 60 is connected to lines 61 at a time. The other registers 60 are not connected to lines 61. As described below, the first one of registers 60 is initially connected to output lines 61. For subsequent iterations of the arbitration procedure the remaining registers 60 are sequentially connected to output lines 61. Each output line 61 carries a signal representing a logic value corresponding to the value of the corresponding bit in the digit of $P_j$ stored in register 60A.

Output 51 of latch 49 is connected to a second input of each of AND gates 62. Consequently, when the ACTIVE flag is set then the outputs of AND gates 62 have logic values corresponding to the bits stored in register 60A. When the ACTIVE flag is not set then the outputs of AND gates 62 have logic values of "0", regardless of the contents of registers 60 and regardless of the second input to each of gates 62.

The outputs of AND gates 62 are each connected to a control line of one of buffers 66. The inputs of buffers 66 are connected to a line having a logic state of "1". The outputs of buffers 66 are each connected to one of bus lines 24. Therefore, when register 60A is connected to the inputs of AND gates 62 through its set of AND gates 63, logic 37 sets those of bus lines 24 which correspond to "1" bits in register 60A to a logic state of "1".

Outputs 61 are also connected to the inputs of a read, control circuit 75 which comprises interconnected AND gates 72, 73. Read control circuit 75 has K outputs. It can be appreciated from FIG. 3 that if all of the bits in register 60A are "0" then the lowest order output line of read control circuit 75 will have a logic level of "1" and the remaining output lines 76 will have logic levels of "0". The relationship between the inputs to read control circuit 75 and the outputs of read control circuit 75 for the case K=4 is illustrated in the following truth table:

TABLE 1

| Input of circuit 75 | Output of circuit 75 |
|---|---|
| 0000 | 0001 |
| 0001 | 0010 |
| 0010 | 0100 |
| 0100 | 1000 |
| 1000 | 0000 |

The outputs of circuit 75 are each connected to a control line of one of buffers 80. Buffers 80 each have an input connected to one of bus lines 24 and an output connected to reset line 55 of latch 49.

It can be appreciated from FIG. 3 that logic 37 reads the bus line 24 which is one higher in order than the highest order "1" bit in register 60A. If that bus line is at a logic level of "1" then the reset line 55 of latch 49 is set to a logic state of "1" and the ACTIVE flag of the module is turned off.

In operation, during steps 105 and 110, in each contending module, the register 60 which corresponds to the highest order digit of code $P_j$ is connected to outputs 61 through AND gates 63. During step 110 a prefix-OR operation is carried out on bus 23 by prefix-OR unit 25.

In step 115, for each contending module, if any other module wrote a digit to bus 23 during step 110 which is larger than the digit in the register 60 which corresponds to the highest order digit of code $P_j$, then the reset line of latch 49 will be set to a logic level of "1" and the module will be removed from contention. In subsequent iterations of steps 110 through 115 registers 60 corresponding to successively lower order digits of code $P_j$ are connected to output lines 61 through the sets of AND gates 63 which are connected to the clock line which has a logic level of "1" during that iteration.

Figure 4A:
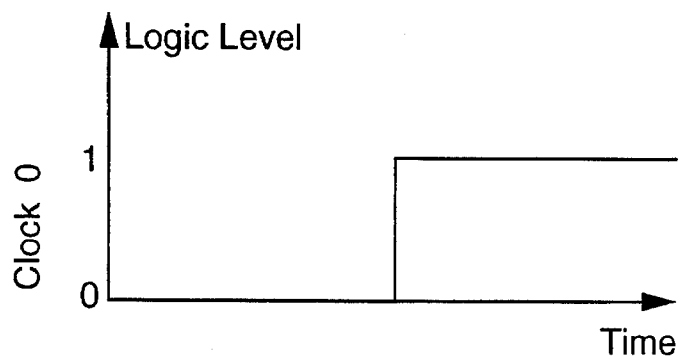
FIGS. 4A and 4B are diagrams of two-phase and single phase clock signals which may be used to coordinate the operation of the circuit of FIG. 3.
Figure 4A:
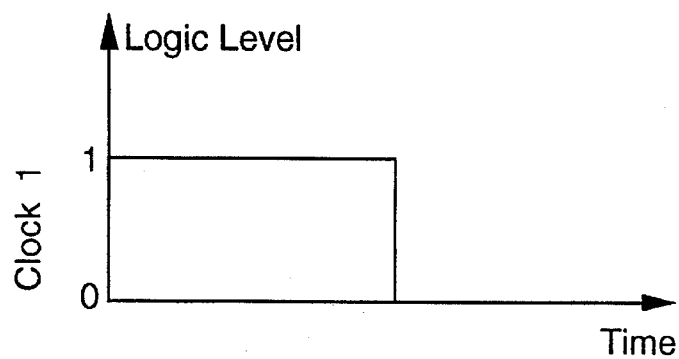
Figure 4B:
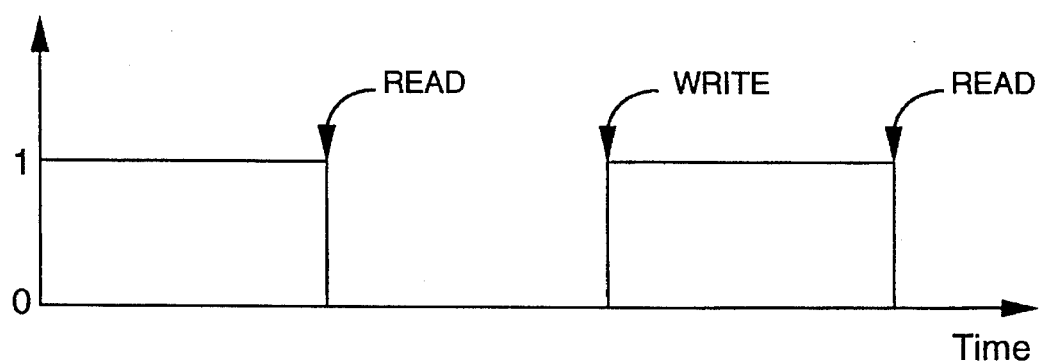

The timing of the operation of logic 37 may be controlled by a two-phase clock, as shown in FIG. 4A. One phase corresponds to CLOCK0, the second phase is connected to CLOCK1. In the alternative, timing may be accomplished in the case where there are two registers with a single phase clock, as shown in FIG. 4B, by using edge-triggering circuitry to enable one of registers 60 on falling edges of the clock signal, and the other register 60 on the rising edges of the clock signal, or vice versa.

Techniques for implementing bus 23 are well known. For example, bus 23 may be an open-collector bus, a precharged bus or any other bus which achieves a "wired OR" function. In most practical such buses, a logic level of 0 refers to a higher bus voltage level and a logic level of 1 refers to a lower bus voltage level. If bus 23 is implemented in CMOS technology then a precharged circuit may be used to pull up the bus to a selected logic level before each write-then-read iteration.

Write lines 40 and read lines 42 may be combined, as shown in FIG. 3, or may be separate. It can be seen from FIG. 3 that, certain bus lines 24 may never be read or written to by a module with a particular code. Consequently, if the codes assigned to the modules in a computer system will be fixed, then it is possible to reduce bus loading by only connecting to bus 23 read lines connected to the bus lines 24 which must be read by the module and write lines connected to the bus lines 24 which must be written to by the module.

Figure 5:
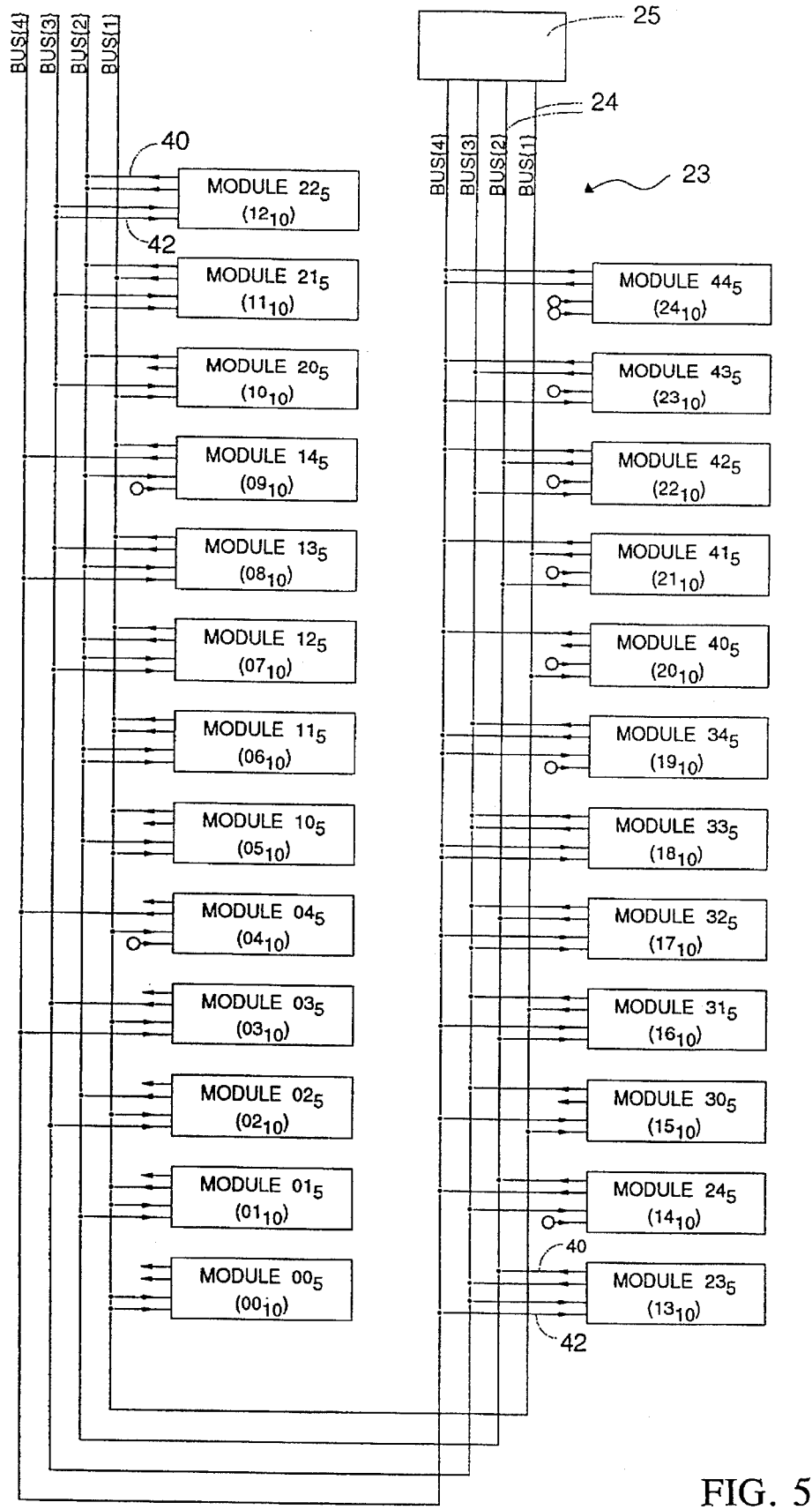
FIG. 5 is a block diagram of a number of modules connected to an arbitration bus.

FIG. 5 shows an example of a 4-line arbitration bus with modules attached. Each module has a code selected from D(2,5). Each module has two write lines 40, one write line corresponding to each digit of the code for that module. If any digit in the code for a module is "0", then the write line in that module corresponding to that digit need not be connected to bus 23.

Each module also has two read lines 42. Each read line corresponds to a digit in the code for that module. If any digit in the code is a "4" (the highest possible value for a digit in D(2,5)) then the read line corresponding to that digit need not be read and may be connected to a line having a voltage representing a logic value of "0".

Figure 6:
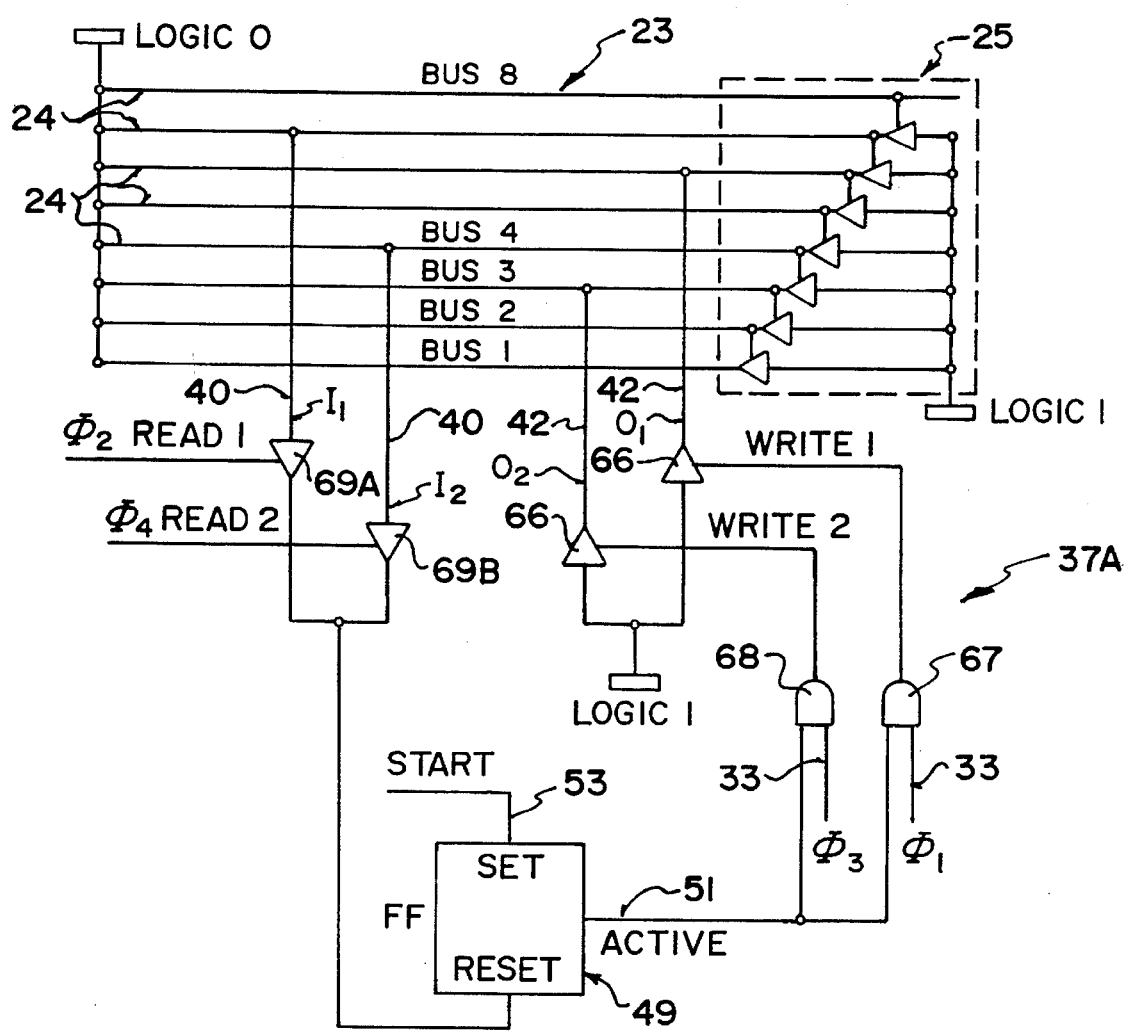
FIG. 6 is a schematic diagram of a simplified alternative form of module logic circuitry.

The logic circuitry in each module may be implemented with no more than 2r one or two input gates and a latch. FIG. 6 shows an alternative simplified module logic circuitry 37A which may be used if it is not necessary to change the codes for the modules under software control. The module logic 37A may be identical for all of the modules attached to bus 23. The code for a module is set by selecting which of bus lines 24 the module's two write lines 40 and two read lines 42 are connected to. In the example shown in FIG. 6, the module may have a priority code selected from the set D(2,9). The particular module shown has a priority code which can be expressed in base 9 as 63. The write lines are designated as $O_i$ where i is an integer (i.e. the first write line is $O_1$, the second write line is $O_2$ etc.). The read lines are designated as $I_i$ where i is an integer (i.e. the first read line is $I_1$, the second read line is $I_2$ etc.)

As shown in FIG. 6, the write line $O_1$ of a module connects to the bus line corresponding to the first digit of that module's priority code (in this case a "6"). If the first digit of the priority code is a "0" then $O_1$ is not connected to bus 23. Read line $I_1$ is connected to the bus line one higher in order than write line $O_1$. In the example shown in FIG. 6, read line $I_1$ is connected to bus{7}, the $7^{th}$ bus line 24. If write line $O_1$ were connected to the highest order bus line (bus{8} in this example) then it would be unnecessary to connect read line $I_1$ to bus 23 because it is not possible that another module could have a higher first digit in its priority code. If write line $O_1$ were not connected to bus 23 (i.e. if the first digit of the priority code for that module was "0") then read line $I_1$ would be connected to bus{1}, the lowest order bus line. The second (and subsequent) pairs of read and write lines are also connected to bus 23 according to the corresponding digit of the module's priority code, as described above.

Figure 7:
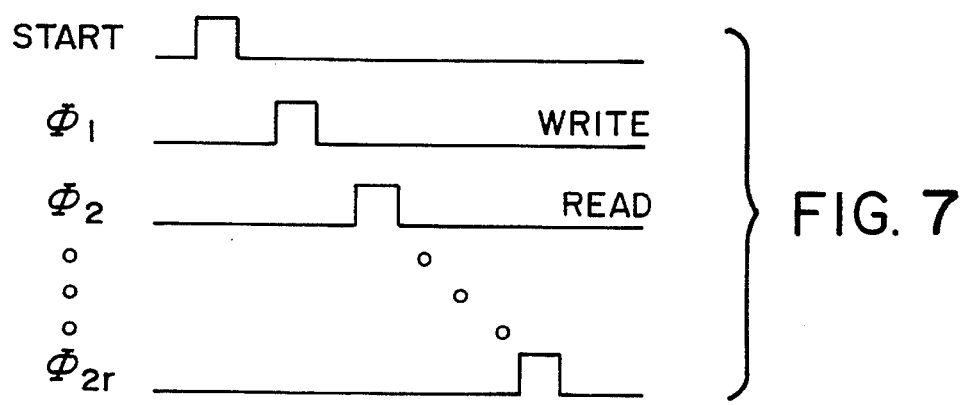
FIG. 7 is a timing diagram for a multi-phase clock for synchronizing the operation of the logic circuitry of FIG. 6.

The arbitration process is synchronous and may be conveniently coordinated by a 2r phase clock 30 having 2r clock lines 33 designated as $\Phi_1, \Phi_2, \Phi_3, \ldots, \Phi_{2r}$. The timing of signals on clock lines 33 is shown in FIG. 7. Logic circuitry 37A comprises a latch 49 which is triggered by a START signal 53, as described above with reference to FIG. 3. The ACTIVE flag, output 51 of latch 49, is connected to the control lines of a pair of buffers 66 through a pair of 2-input AND gates 67, 68 Buffers 66 are connected between a line having a logic level of "1" and write lines $O_1$ and $O_2$ which are connected to bus 23 as described above. The second input of AND gate 67 is connected to a clock line 33 carrying a clock signal $\Phi_1$. The second input of AND gate 68 is connected to a second clock line 33 carrying a clock signal $\Phi_3$. Subsequent read lines 40 would be connected to clock lines $\Phi_n$, where n is an odd integer. In this way, write line $O_i$ writes a 1 on a line of bus 23 if the module is active and if the corresponding clock line $\Phi_{2n-1}$ is at a logic 1 level. Otherwise, write line $O_i$ is isolated from bus 23 by tri-state buffer 66.

Read lines $I_1$ and $I_2$ are connected to the reset line of latch 49 through another pair of tri-state buffers 69A and 69B respectively. The control lines of tri-state buffers 69A and 69B are connected to clock lines 33 carrying clock signals $\Phi_2$ and $\Phi_4$ respectively. The timing of clock signals $\Phi_1$, through $\Phi_4$ regulates the operation of logic circuitry 37A. When $\Phi_1$, goes high then write line $O_1$ writes a "1" on bus{6}. A prefix-OR operation is then carried out on bus 23, as described below. Next, $\Phi_2$ goes high. If bus{7} has a logic value of "1" when $\Phi_2$ is high then latch 49 is reset and the module is removed from contention. Next, $\Phi_3$ goes high and the module writes a "1" on bus{3} through write line $O_2$. A further prefix-OR operation is carried out on bus 23. Finally, $\Phi_4$ goes high. If bus{4} has a logic value of "1" when $\Phi_4$ is high then latch 49 is reset and the module is removed from contention. If the module has not been removed from contention at this point then it is the winning module.

Figure 8A:
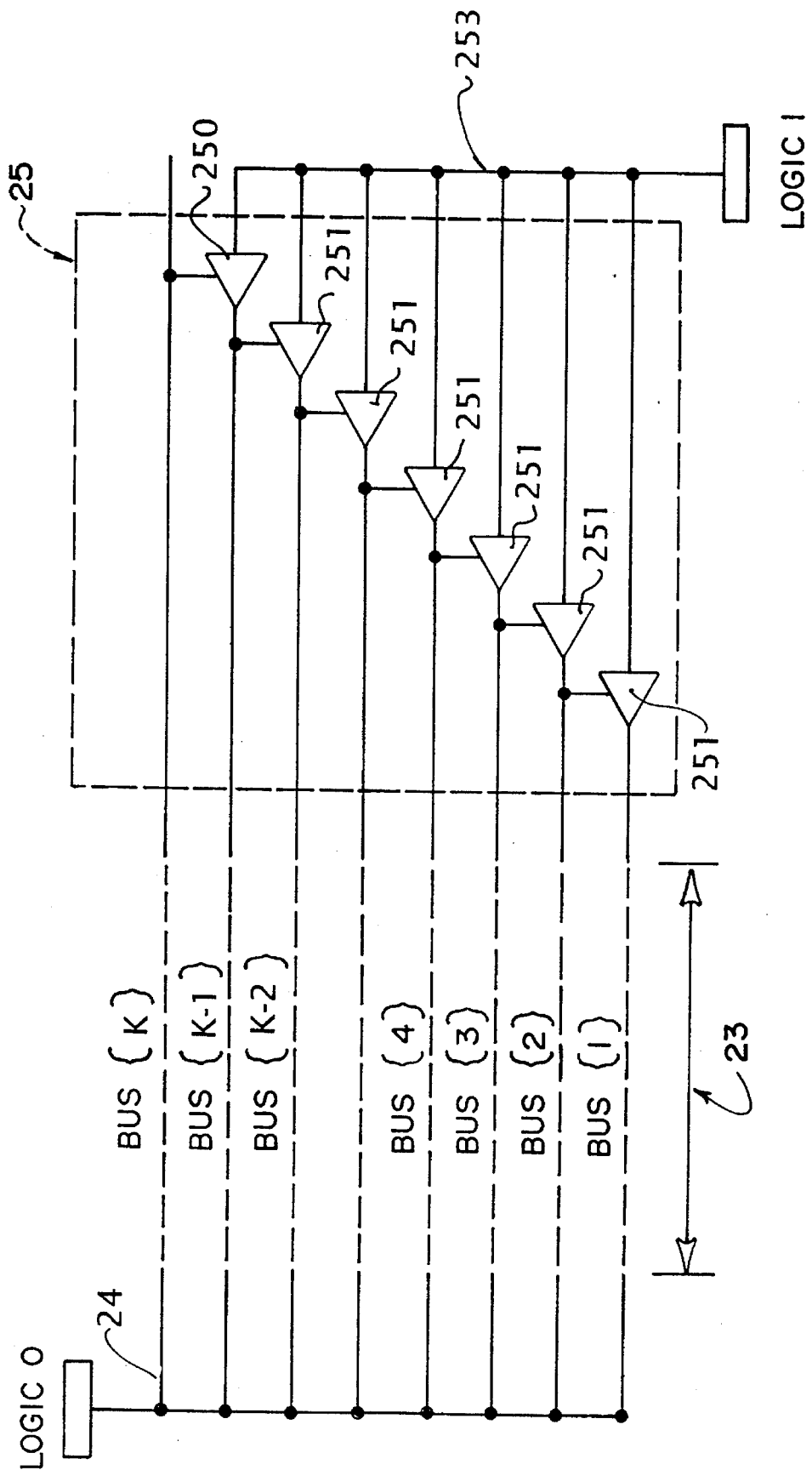
FIGS. 8A and 8B are schematic diagrams of prefix-OR units according to the invention.

FIG. 8A shows a prefix-OR unit 25 which may be used to practice the invention. As shown in FIG. 1, prefix-OR unit 25 is connected to the K bus lines 24 of bus 23. Prefix-OR unit 25 reads bus 23 and writes a transformed value onto bus 23 as defined by Equation (2), (5).

Prefix-OR unit 25 comprises a cascade of tri-state buffers 250, 251. The first tri-state buffer 250 is connected between bus line bus{K−1} and a line 253 which is set to a voltage representing a logical 1. The control line of tri-state buffer 250 is connected to bus line bus{K}. Subsequent tri-state buffers 251 are connected between line 253 and bus lines bus{K−2}, bus{K−3}, ..., bus{1} respectively. The control line for each of tri-state buffers 251 is connected to the bus line one higher in order than the output of that tri-state buffer 251. For example, the tri-state buffer 251 which is connected between line 253 and bus line bus{3} has an input connected to bus line bus{4}. It can be seen that with prefix-OR unit 25 connected to bus 23, if any bus line, bus{i}, is set to a logic value of 1, then all of bus lines 24 which are lower in order than bus{i} will also be set to a logic value of 1.

Prefix-OR unit 25 may be implemented using alternative circuitry to optimize design parameters, such as bus-settling delay. Since there is only one prefix-OR unit on bus 23, prefix-OR unit 25 may use powerful bus drivers or other circuit optimization techniques to reduce the settling time of bus 23 without causing the overall system to be excessively expensive.

Figure 8B:
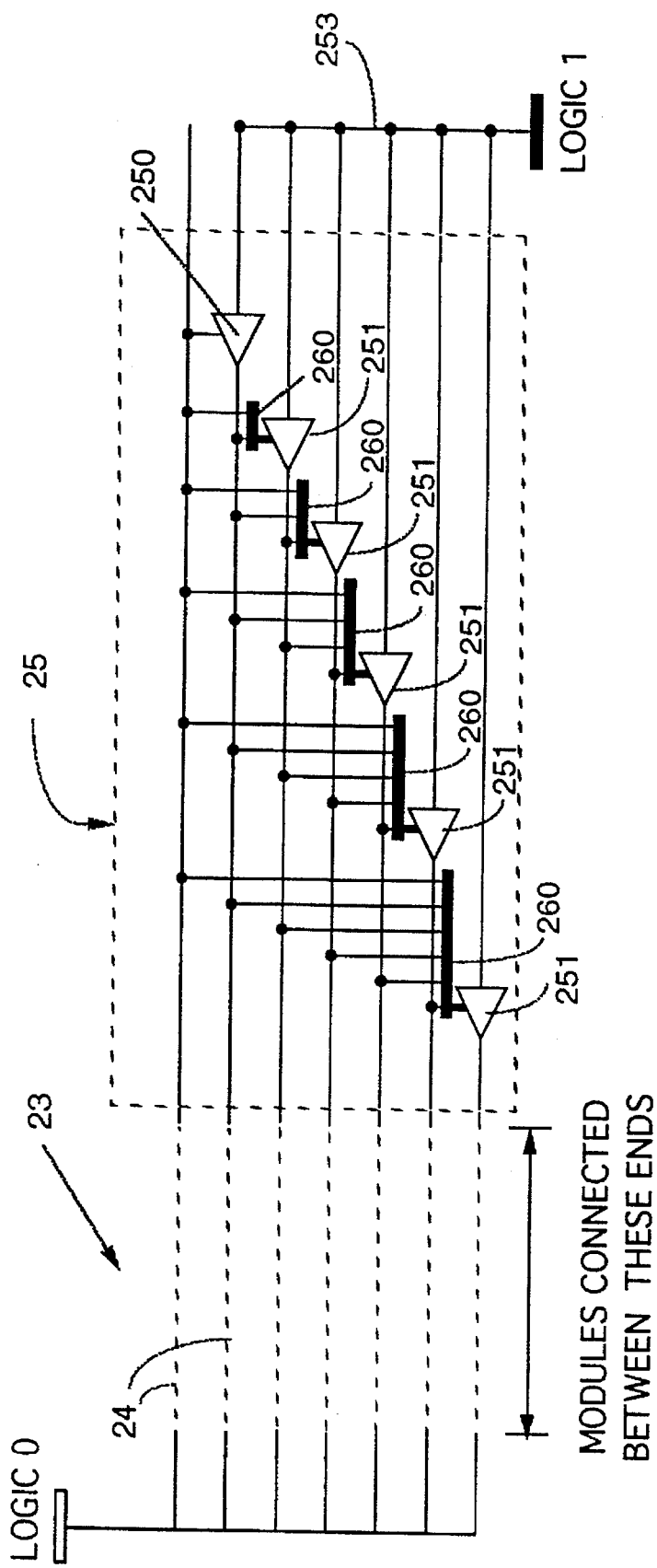

FIG. 8B shows an alternative construction for prefix-OR unit 25. In the embodiment shown in FIG. 8B the control lines of tri-state buffers 251 are connected to the outputs of OR gates 260. Each OR gate 260 has inputs connected to all of bus lines 24 which are higher in order than the bus line 24 of the tri- state buffer to which the OR gate is connected. In general, the prefix-OR unit of FIG. 8B is faster than the prefix-OR unit of FIG. 8A at the cost of some increase in complexity.

It can be seen from the foregoing that the synchronous arbitration procedure of this invention can be simpler than the asynchronous arbitration schemes proposed in the prior art. In particular, the bus reading operation (step 115) of this invention may require each module to read only a single bus line 24. Many of the prior art asynchronous methods require that each module read several bus lines and compute the logical OR of the logic states of these bus lines in each read operation. In the worst case, such prior art methods may require the computation of the logical OR of the logic values of all of the bus lines. Furthermore, because of the reduced bus loading in a computer system according to this invention the bus settling time should be shorter than the bus settling time in computer systems using previous asynchronous priority arbitration methods.

The invention allows a large number of modules to be connected to a single bus. Using elementary counting techniques it can be shown that N(r, K+1), the maximum number of modules that can be attached to a K-line bus 23, is given by $(K+1)^r$ where the priority codes are selected from the set D(r, K+1). It can also be shown that the number L of module outputs which are connected to the same bus line in such a system is given by:

$$L(r, K+1) = \sum_{j=0}^{r-1} K^j (K+1)^{r-1-j} = (K+1)^r - K^r \quad (5)$$

The relationship between L and N is given by the following formula:

$$\frac{L(R, K+1)}{N(r, K+1)} = 1 - \left(\frac{K}{K+1}\right)^r \quad (6)$$

From formula (4) it can be seen that the ratio L/N decreases as r and K decrease and that L is less than N. Therefore, the number of module outputs which must be connected to any bus line is less than the total number of modules. For example, for a 4-line arbitration bus (K=4) the modules assigned to the bus may be assigned codes from any code set having the form D(r, 5). Thus, choosing r=2 will enable arbitration among a maximum of N(2,5)=25 modules in 2 time units, choosing r=3 will enable arbitration among a maximum of N(3,5)=125 modules in 3 time units.

Table 2 illustrates the trade-offs between bus width, arbitration time, size of arbitration logic (number of read/write units), load per bus line, and maximum number of modules that may be achieved with the invention:

TABLE 2

| Code Set | Bus Width | Max. Modules | Time for Arb. | Logic per Module | Load per bus line |
|---|---|---|---|---|---|
| D(1,4) | 3 | 4 | 1 | 1 | 1 |
| D(2,4) | 3 | 16 | 2 | 2 | 7 |
| D(3,4) | 3 | 64 | 3 | 3 | 37 |
| D(4,4) | 3 | 256 | 4 | 4 | 175 |
| D(1,5) | 4 | 5 | 1 | 1 | 1 |
| D(2,5) | 4 | 25 | 2 | 2 | 9 |
| D(3,5) | 4 | 125 | 3 | 3 | 61 |
| D(4,5) | 4 | 625 | 4 | 4 | 369 |
| D(1,6) | 5 | 6 | 1 | 1 | 1 |
| D(2,6) | 5 | 36 | 2 | 2 | 11 |
| D(3,6) | 5 | 216 | 3 | 3 | 91 |
| D(4,6) | 5 | 1296 | 4 | 4 | 671 |
| D(1,8) | 7 | 8 | 1 | 1 | 1 |
| D(2,8) | 7 | 64 | 2 | 2 | 15 |
| D(3,8) | 7 | 512 | 3 | 3 | 169 |
| D(4,8) | 7 | 4096 | 4 | 4 | 1695 |

From Table 2 it can be seen that a very high density of modules can be serviced by an arbitration bus of relatively small width. For a given bus width the number of modules that can be serviced increases exponentially with the number of arbitration steps.

Figure 9:
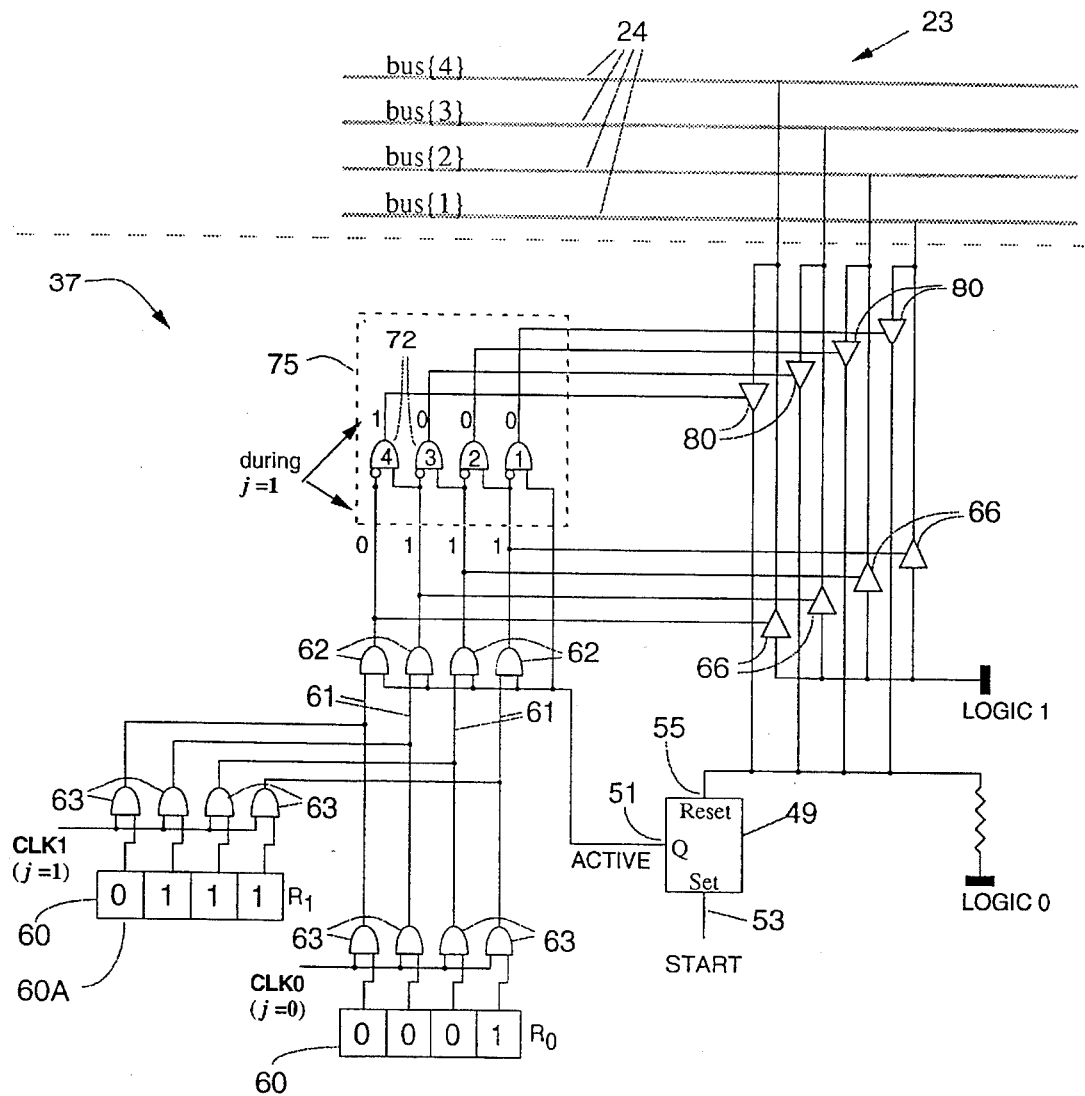
FIG. 9 is a schematic diagram of a second alternative form of arbitration logic circuitry having distributed prefix-OR operation.

As shown in FIG. 9, the prefix-OR function can be distributed among modules $M_j$. The circuit of FIG. 9 is similar to the circuit of FIG. 3 with the exception of the construction of read control circuit 75 and the format in which digits of codes $P_j$ are stored in registers 60. In the circuit of FIG. 9, the digits of codes $P_j$ are represented as sorted codes. Therefore, a sorted word is automatically written to bus 23 in each write operation. No separate prefix-OR unit is required to convert BUS into a sorted word.

TABLE 3

| Input to circuit 75 | Output from circuit 75 |
|---|---|
| 0000 | 0001 |
| 0001 | 0010 |
| 0011 | 0100 |
| 0111 | 1000 |
| 1111 | 0000 |

Table 3 shows the outputs of the read control circuit 75 of FIG. 9 as a function of the allowable inputs to read control circuit 75 for the case r=4.

Where the arbitration logic of FIG. 9 is used then the procedure for arbitrating between competing modules operates as follows:

PROCEDURE ARBITRATE 1

% the following procedure is performed synchronously by
% each active module $M_j$.

```
100 begin
    if j ∈ A₀ then ACTIVE(j)←1    % set the ACTIVE flag if
                                    % M_j is a contending module
    for k=r-1 down to 0 do % for q=1 to q=r
        begin
        105.  if d_k ≥ 1 then write a 1 on bus {d_k}, bus {d_k−1} . . .
              bus {1};
        115.  if d_k+1 ≤ K then read bus {d_k+1};
              if bus{d_k+1} = 1 then ACTIVE (j)←0;
        120.  initialize bus 23;
        end
    130. Upon completion of the arbitration procedure, only the
         module with the highest priority remains active. This
         module can then write its priority code on bus 23, if
         needed.
end
```

It can be seen that this procedure is the same as the procedure ARBITRATE given above except that steps 110 and 115 are combined.

The logic circuitry shown in FIGS. 3 and 9 is well adapted to systems in which the priorities of different modules are reprogrammed or rotated under software control. This can be desirable to guarantee fairness in the arbitration procedure. The priority code of the module may be changed simply by changing the contents of registers 60.

Alternative Embodiment Using Bounded Weight Codes

In an alternative embodiment of the invention, binary codes $P_j$ are binary words selected from the set of so called "bounded weight codes" having a length, m, equal to K, the number of lines in the bus that will be used for priority arbitration. That is, codes $P_j$ are binary words of a length m, chosen with the constraint that the number of 1-bits in each code is not greater than a number n. The weight, l, of a binary string is defined as the number of 1-bits in the binary string. If we define B(m,n), where $0 \leq n \leq m$, as the set of all m-bit binary words in which each word has at most n bits equal to 1 and the remaining bits equal to 0, then, with a bounded-weight coding scheme, codes $P_j$ are selected from B(m,n).

In a further alternative embodiment of the invention, codes $P_j$ are so called "constant-weight codes". In this case, we say that codes $P_j$ are selected from the set C(m,n), where $0 \leq n \leq m$ and C(m,n) denotes the set of all m-bit binary words in which each word has exactly n bits equal to and the remaining m-n bits equal to 0. The number of code words in C(m,n) is given by the binomial coefficient:

$$N_C = \binom{m}{n} \tag{7}$$

As $B(m,n) = C(m,0) \cup C(m,1) \cup C(m,2) \cup \ldots \cup C(m,n)$ the number of code words in B(m,n) is given by:

$$N_B(m,n) = \sum_{q=0}^{r} \binom{m}{q} \text{ where } \binom{m}{0} = 1 \tag{8}$$

Since $C(m,n) \subset B(m,n)$, the arbitration methods of the invention will work with either constant-weight codes or bounded-weight codes.

Using constant-weight codes allows the arbitration method to be simplified. On the other hand, for given values of m and n, there are more unique bounded-weight codes than there are unique constant weight codes. Thus, where a bounded-weight coding scheme is used, more modules can be connected to a bus of width K than when a constant-weight coding scheme is used. Since B(K,n) contains $N_B$ possible code words, and each module is assigned a unique code word, no more than $N_B$ modules may be connected to bus 23 (that is, $N \leq N_B$).

Codes $P_j$ which belong to the set B(K,n) are denoted as $P_1$, $P_2, \ldots P_{N3}$. The notation $P_j\{i\}$ denotes the $i^{th}$ bit of the code assigned to the $j^{th}$ module. Therefore, $P_j\{K\}$ is the most significant bit of $P_j$ and $P_j\{1\}$ is the least significant bit of $P_j$.

The notation $\rho_i^{(j)}$ denotes the position, counting from the least significant bit of $P_j$, of the $i^{th}$ most significant 1-bit in $P_j$. Thus, $\rho_1^{(j)}$ is the position of the most significant 1-bit in $P_j$ and $\rho_1^{(j)} > \rho_2^{(j)} > \rho_3^{(j)} > \ldots > \rho_r^{(j)}$ if they all exist. If the code word $P_j$ has a weight $l < r$ then, by convention, $\rho_{l+1}^{(j)} = \rho_{l+2}^{(j)} = \ldots = \rho_r^{(j)} = 0$. The superscript (j) will be omitted when it is not necessary for clarity. For example, for the code $P_j = 01010000$ which is a member of B(8,3), $\rho_1 = 7$, $\rho_2 = 5$ and $\rho_3 = 0$.

The "interval", k, of a bit string is defined as the number of intervals in the bit string which consist of one or more consecutive 1-bits. For example, the string 00111010111 has three such intervals. Each unbroken string of 1's in the string is a 1-interval. The number of 1-intervals in a binary string, b, is denoted by interval(b). For example, interval(0111001101101)=4.

The symbol $\sigma_i$ represents the position of the highest order bit in the $i^{th}$ most significant 1-interval in the bit string $P_j$, where $1 \leq i \leq k$ and $k = \text{interval}(P_j)$ (For example, for $P_j = 00111011010$, interval($P_j$)=3, $\sigma_1 = 9$, $\sigma_2 = 5$, and $\sigma_3 = 2$). We further define $\sigma_i$ so that, where $P_j \in B(K,n)$, if weight($P_j$)=l, interval($P_j$)=k, l<n, and $P_j[1]=0$ then $\sigma_{k+1} = 0$. For example, if $P_j \in B(9,4)$ and $P_j = 000110000$, then $\sigma_1 = 6$, and $\sigma_2 = 0$. In this case $\sigma_{k+1}$ is defined even though $P_j$ has only k intervals. Note that where $1 \leq i \leq k$, for any i, $P_j\{\sigma_i\}=1$ and $P_j\{\sigma_i+1\}=0$, except for the case where $\sigma_1 = m$, in which case, $P_j\{\sigma_i+1\} = P_j\{K+1\}$ is undefined.

A code $P_a$ of length m is greater than another code $P_b$ also of length m if and only if there exists an x in $1 \leq x \leq m$, such that $P_a$ and $P_b$ have the same m-x most significant bits but $P_a\{x\}=1$ while $P_b\{x\}=0$.

ARBITRATION METHOD

Figure 10:
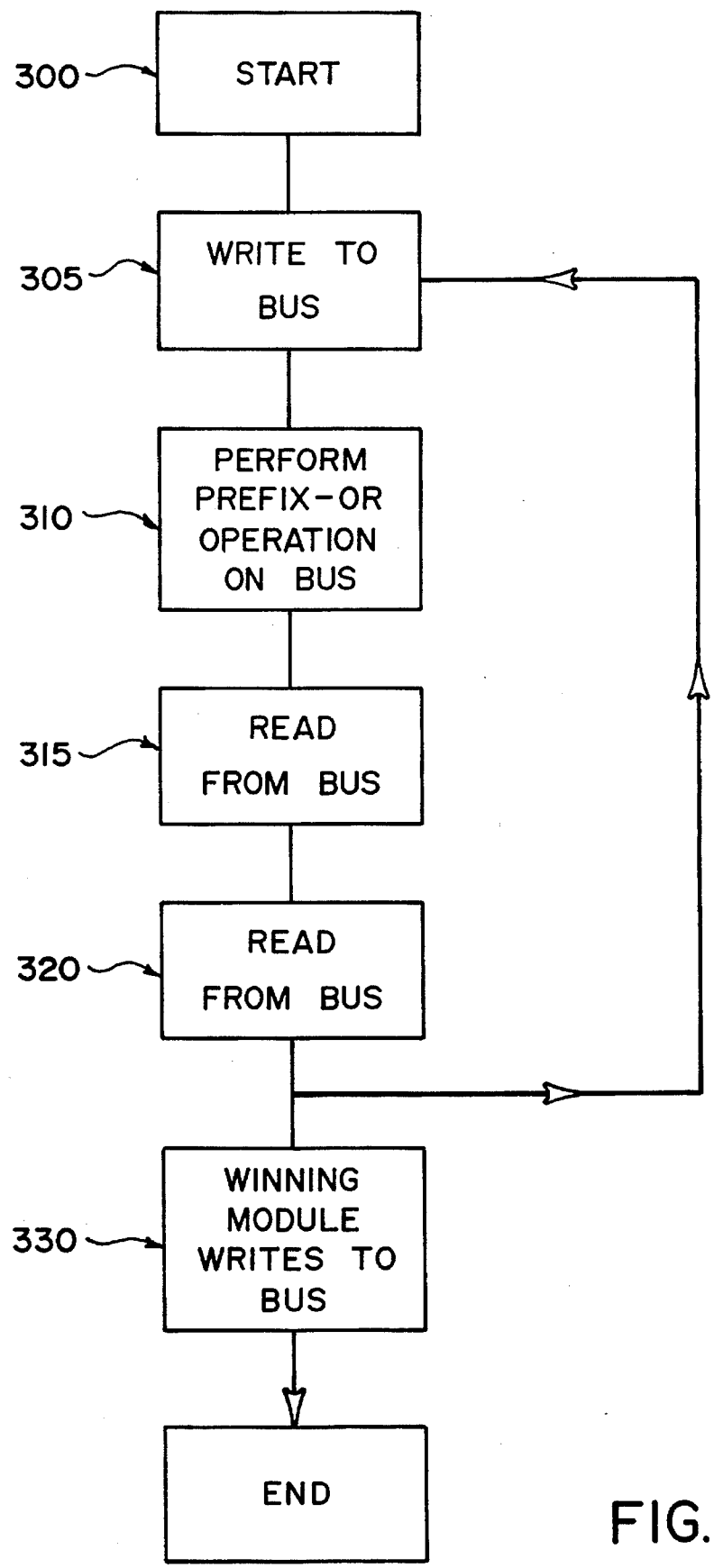
FIG. 10 is a flow chart showing an alternative arbitration method according to the invention in which modules are assigned bounded weight codes.

The arbitration process operates as shown in FIG. 10. When the arbitration process begins, at 300, each module $M_j$ has been assigned a code word $P_j \in B(K,n)$ (i.e. m=K, the number of lines in bus 23). Each code word $P_j$ has a weight $1 \leq n$ and an interval k. Each module $M_j$ has an ACTIVE flag to signal to the rest of the system when it is contending to use a resource. In step 300 the arbitration is triggered by a START signal which is generated by the computer system. At the end of step 300, the contending modules have their ACTIVE flags set. Other modules $M_j$ which are not requesting access to the resource may also be connected to bus 23. These non-contending modules $M_j$ do not have their ACTIVE flags set and do not take part in the arbitration process.

The arbitration process loops through steps 305 through 320 until the contending module with the highest priority code $P_j$ has been uniquely identified. The number of the current iteration is represented by q, q=1,2, . . . n. A maximum of n iterations of steps 305 through 320 is needed to uniquely identify the contending module with the highest priority code $P_j$.

As described below, during each iteration some contending modules may be removed from contention and will have their ACTIVE flags set off These modules become inactive and do not take part further in the arbitration. We define $A_q$ to be the set of modules $M_j$ remaining in contention after the $q^{th}$ iteration of the arbitration procedure. $A_0$ is the initial set of contending modules $M_j$. Similarly, $A_1, A_2 \ldots$ are the sets of modules remaining in contention after the first, second, and successive iterations of steps 305 through 320.

In step 305, each module $M_j$ writes a bit $P_j\{\rho_q\}$ on bus line bus$\{\rho_q\}$. Next, in step 310, a prefix-OR operation is performed on bus 24. After the prefix-OR operation in step 310, which may be performed simultaneously with writing step 305, comes a first reading step 315. During step 315 each module $M_j$ may read bus line bus$\{1\}$. Module $M_j$ reads bus line bus$\{1\}$ if, for code $P_j$, l<n AND $P_j\{1\}=0$ and if q=k+1. If bus$\{1\}$=1 then the module $M_j$ removes itself from contention (i.e. turns its ACTIVE flag off). It can be seen that step 315 may be omitted if codes $P_j$ are constant weight codes because, for constant weight codes, l=n so the condition l<n is never satisfied. If bus$\{1\}$=0 then module $M_j$ remains in contention (i.e. its ACTIVE flag remains set) and the arbitration process continues.

After step 315 comes a second reading step 320. Steps 315 and 320 may be performed simultaneously. During step 320 each module $M_j$ may read one of bus lines bus$\{i\}$. If $P_j\{\rho_q+1\}=0$ AND $\rho_q<m$ then module $M_j$ reads bus$\{\rho_q+1\}$. If bus$\{\rho_q+1\}=1$ then the module $M_j$ removes itself from contention (i.e. turns its ACTIVE flag off). If bus$\{\rho_q+1\}=0$ then module $M_j$ remains in contention (i.e. its ACTIVE flag remains set) and the arbitration process continues. An advantage of the invention is that during read steps 315 and 320 each module only needs to read a single line of bus 23.

This arbitration process will always end with only a single module $M_j$ remaining in contention after, at most, n iterations of steps 305 through 320. In step 330 the "winning" module (i.e. the sole member of set $A_n$) writes its code word onto bus 24. The computer system can then use the value on bus 24, in conventional ways, to permit the winning module to access the shared resource.

The arbitration process can be summarized by the following pseudo-code, in which text following a % sign is a comment:

```
Procedure ARBITRATE2{K,n}
300 begin
      ifj ∈A₀ then ACTIVE(j)←1     % Each module Mⱼ has
                                    % a code word Pⱼ with
                                    % weight l and
                                    % interval k.
      h←–1+Pⱼ{K}                   % h is an index.
      for q=1 to K do
      begin
        305.  Each module Mⱼ, where j ∈A_{q–1} writes bit Pⱼ{ρ_q}
              on bus line bus{ρ_q}.
        310.  Perform prefix-OR operation on bus 23.
        315.  If (l<n AND Pⱼ[1]=0) AND q=k+1 then module
              Mⱼ reads bus{1}.   If bus {1}=1 then
              ACTIVE(j)←0.
        320.  If (ρ_q<K AND Pⱼ{ρ_q+1}=0) then module Mⱼ
              performs the following:
              begin
              320A.  Read bus{ρ_q+1}. If bus{ρ_q+1}=1
                     then ACTIVE(j)←0.
              320B.  Perform h←h+1.
              end
       end
330.   Upon completion of the arbitration procedure, only the
       module with the highest priority remains active. This
       module can then write its priority code on bus 23, if
       needed.
end
```

Procedure ARBITRATE2 consists of, at most n iterations. In the $q^{th}$ iteration all competing (active) modules $M_j$ examine position $\rho_q$ of their priority code $P_j$. Only those modules with the maximum such position remain active. In the first iteration (q=1) all modules for which $\rho_1=K$ (i.e. all modules in which the highest order bit of $P_j$ is 1) do not execute step 320 because for such modules the condition $\rho_1<K$ is not satisfied. These modules remain active throughout the first iteration regardless of the status of bus lines 24 and do not need to read bus 23 during the first iteration of the arbitration procedure.

To understand procedure ARBITRATE2 consider that since the codes $P_j$ assigned to modules $M_j$ are unique, one of modules $M_j$ will have a code which is greater than the codes of any of the other contending modules. We define $P_{max}=^{max}_{i \in A_0}\{P_i\}$, and let $\rho_1^{max}, \rho_2^{max}, \ldots, \rho_n^{max}$ denote the positions of the 1-bits in $P_{max}$. Each iteration q starts by each contending module $M_j$ writing a 1 on bus line bus$\{\rho_q\}$ (step 305). $\rho_q$ may be different for different modules. After a delay, to allow bus 23 to settle, each bus line will carry the logical OR of all of the signals written to that bus line by all of modules $M_j$. Prefix-OR circuit 25 then converts the binary code written on bus 23 to a sorted code which is placed back on bus 23 (step 310). If the state of bus 23 is represented by a vector BUS$_m$ then, after step 310 in iteration q, $\lambda_K($BUS$_K)=\rho_q^{max}$ and BUS$_K=S_{(\rho_q^{max})}$. In iteration q, each active module reads bus$\{\rho_q+1\}$ only if $P_j[\rho_q+1]=0$. If $P_j\{\rho_q+1\}=0$ and bus$\{\rho_q+1\}=1$ then $P_j$ has $\rho_q<\rho_q^{max}$ and consequently, module $M_j$ cannot win the arbitration. Therefore, procedure ARBITRATE2 calls for module $M_j$ to become inactive under these circumstances (step 320A).

For procedure ARBITRATE2 to work, all of the bits on bus 23 higher in order than $\rho_q^{max}$ must be 0 in iteration q. It can be proven by induction on the variable q that this will always be the case. That is, it can be proven that at the end of iteration q, $1 \leq q \leq n$, all active modules will have priority codes having the property $\rho_1=\rho_1^{max}$, $\rho_2=\rho_2^{max}$, . . . , $\rho_q=\rho_q^{max}$ (i.e. the q highest order bits in the priority codes in all modules which remain active after iteration q are identical and are identical to the q highest order bits in $P_{max}$).

Consider the case q=1. Then, following execution of step 320A, only modules with the largest $\rho_1$ remain active. All modules for which $\rho_1<\rho_1^{max}$ will find the condition BUS$\{\rho_1+1\}=1$ in step 320A to be satisfied because BUS$_m=S_{(\rho_q^{max})}$ and $\rho_1+1<\rho_1^{max}$. Those modules for which $\rho_1<\rho_1^{max}$ therefore remove themselves from contention and disable their ACTIVE flags during step 320A. Thus, the only modules that survive the first iteration are those modules with $\rho_1=\rho_1^{max}$. It can be similarly seen that at the end of iteration q=r only modules with $P_j=P_{max}$ remain in contention. However, because each module has a unique priority code, the arbitration procedure ends with only one module remaining in contention (i.e. $A_r$ is a singleton).

The time required to complete the arbitration procedure of the invention is at most r units, where one unit of time is the time required for one iteration of the procedure. Each iteration comprises a write operation (step 305), a bus prefix-OR operation (step 310), and a read operation followed by the activity to update the status of each module (steps 315 and 320). Each unit of time is dominated by the time required for bus lines 24 to settle to a stable state after the write operation of step 305 is completed.

APPARATUS

Figure 11:
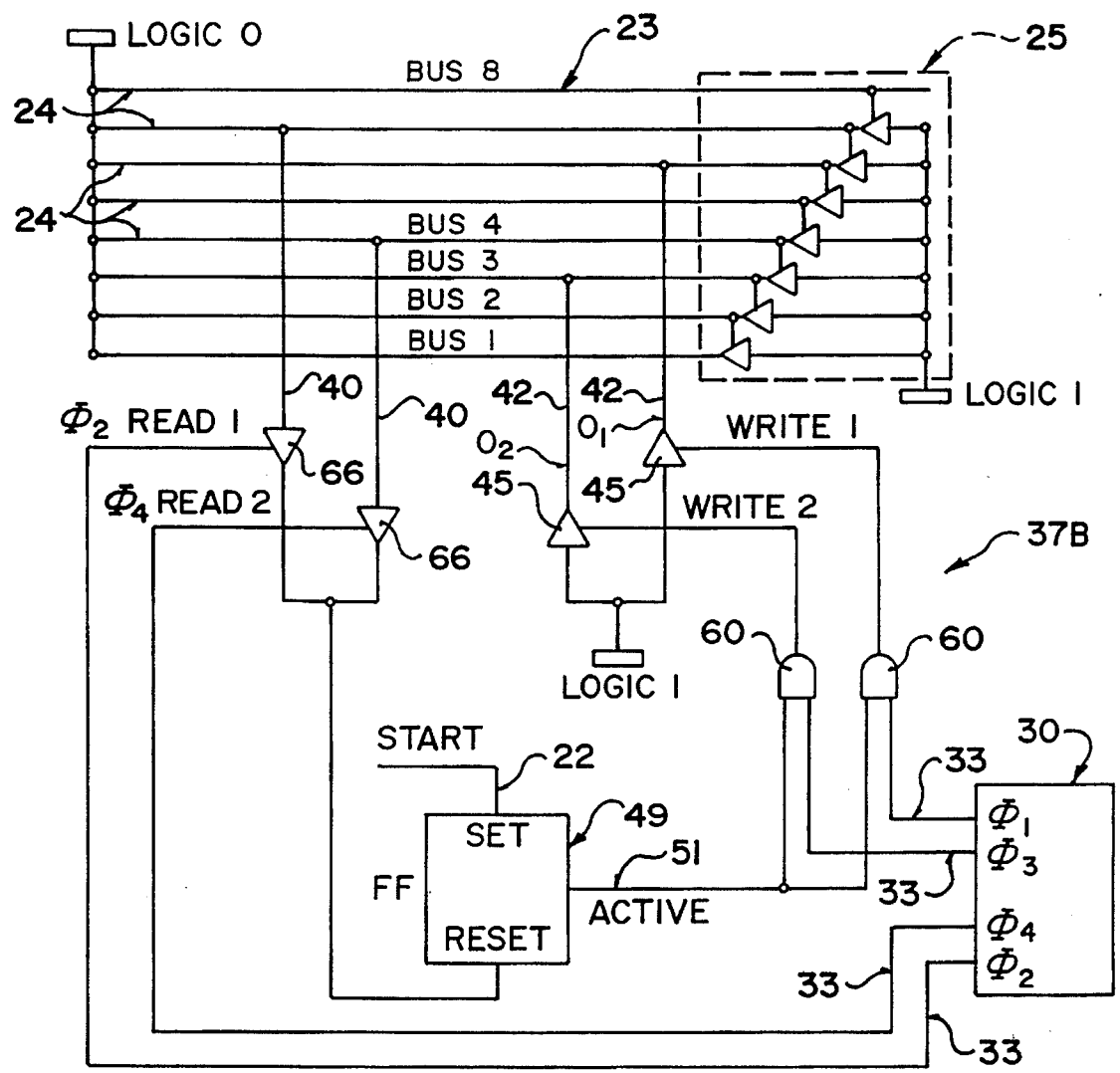
FIG. 11 is a schematic diagram of logic circuitry from a module for use in a system using the method of FIG. 10; and, FIG. 12 is a schematic view showing the interconnections of four modules connected to an arbitration bus in a system using the method of FIG. 10.

FIG. 11 shows the circuitry for arbitration logic units 37B in modules $M_j$ according to the invention. The system of FIG. 11 uses codes $P_j$ selected from the set B(8,2). From the foregoing, it is easy to generalize to other values for K and n. As shown in FIG. 1, the arbitration logic circuits 37B in modules $M_j$ are connected to bus lines 24 by read lines 40 and write lines 42. For each module $M_j$ a maximum of n read lines 40 and n write lines 42 are required to practice the invention. Each one of modules $M_j$ has assigned to it a unique priority code $P_j$.

Each module $M_j$ has a latch 49 with an output 51 which serves as an ACTIVE flag. When one of modules $M_j$ needs to access a shared resource it transmits a request signal on a control line (not shown). The signal generated by module $M_j$ results in the issuance of a START signal 22 after the completion of some intermediate steps. START signal 22 sets latch 49 as described above with reference to FIG. 3.

Each module $M_j$ is connected to bus 23 by l write lines 42 which are designated as $O_1, O_2, \ldots O_{n'}$, where l is the weight of $P_j$. All of write lines $O_1, O_2, \ldots O_n$ are normally either in a logic "0" state or isolated from bus 23. Preferably, write lines 42 are connected to bus lines 24 through controllable devices 45 such as tri-state buffers. In this way, module $M_j$ can write a i on the bus line to which write line $O_i$ is connected by setting write line $O_i$ to a logic level of 1. Otherwise (i.e. if $O_i$=0), write line $O_i$ is isolated from bus 23 and does not unnecessarily load bus 23.

The connections of write lines 42 to bus lines 24 depend upon the code word $P_j$ assigned to each module $M_j$ as follows. In each module $M_j$, each output line $O_i$ is connected to bus line bus$\{\rho_i\}$, $1 \leq i \leq l$. Module $M_j$ is connected by write lines 42 only to as many of bus lines 24 as there are 1-bits in the code word $P_j$ which has been assigned to module $M_j$. The module shown in FIG. 11 has the priority code 00100100.

Figure 12:
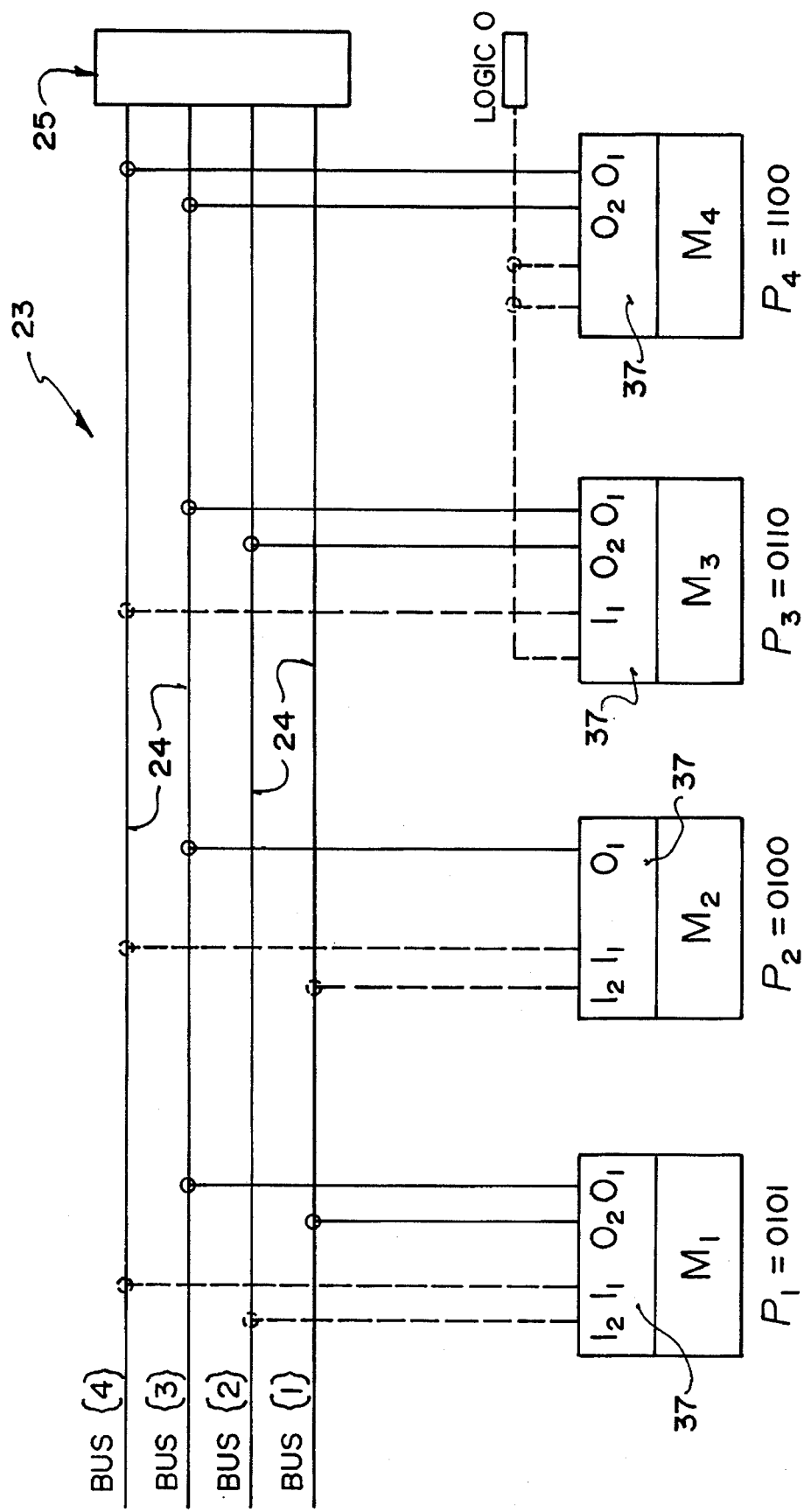

For example, FIG. 12 shows the interconnection of four modules $M_1, M_2, M_3$ and $M_4$ connected to an arbitration bus having a width K=4. Modules $M_1, M_2, M_3$ and $M_4$ have been assigned the codes 0101, 0100, 0110 and 1100 respectively. These codes all belong to the set B(4,2). It can be seen that for each module there is a 1:1 correspondence between the bits in the code $P_j$ assigned to that module and the connections of write lines 42 to bus lines 24 correspond to the positions of the 1-bits in the codes. Read lines 40 are connected to bus lines 24 which correspond to bit positions 1 bit higher in order than the highest order bit of each 1-interval in $P_j$. Module $M_4$ does not need to read any bus lines because its code $P_4$=1100 has the highest priority in B(4,2). Consequently, module $M_4$ will win the arbitration whenever it is contending.

The arbitration process is synchronous and may be conveniently coordinated by a 2n phase clock 30 having 2n clock lines 33 designated as $\Phi_1, \Phi_2, \Phi_3, \ldots, \Phi_{2n}$ as shown in FIG. 7. As shown in FIG. 11, write lines 42 are each connected to the output of an AND gate 60 which has one input connected to the ACTIVE flag 21 of module $M_j$ and a second input connected to clock line $\Phi_p$, where p is an odd integer. That is, clock line $\Phi_1$ is connected to an input of AND gate 60 of write line $O_1$, clock line $\Phi_3$ is connected to an input of AND gate 60 of write line $O_2$, clock line $O_5$ is connected to an input of AND gate 60 of write line $O_3$, and so on. In this way, write line $O_i$ writes a 1 on a line of bus 23 if the module is active and if the corresponding clock line $\Phi_{3i-1}$ (where i is an integer) is at a logic 1 level. Otherwise, write line $O_i$ is isolated from bus 23 by tri-state buffer 45.

Each module $M_j$ is also connected to bus 23 by zero, one, or more read lines 40 which are designated as The connections of read lines $I_h$ to bus lines 24 are determined for each module $M_j$ by the code $P_j$ assigned to that module $M_j$.

Read lines $I_h$ are connected to bus lines 24 as follows. In each module $M_j$, each read line $I_h$ is connected to bus line bus{$\sigma_h$+1}, 1≦h≦k+1. However, if $\sigma_1=\rho_1$=K then read line $I_1$, is not used, since there is no bus{K+1}. Furthermore, read line $I_{k+1}$ is connected to bus{1} only if weight($P_j$)<r and $P_j${1}=0. Otherwise, $I_{k+1}$ need not be connected to any one of bus lines 24. In the cases defined above where read lines $I_1$, or $I_{k+1}$ are not connected to any of bus lines 24, such read lines would not affect the outcome of the arbitration procedure. Those read lines which are not connected to bus 23 are simply set to a logic value of 0 so that the module remains in contention during any step when those read lines are read. Depending upon the values of $P_j$ for the modules connected to bus 23, some of bus lines 24 may never be read or written to. Such bus lines may be omitted without affecting the operation of the invention. Omitting such bus lines would limit the addition of new modules to the bus because only modules with values of $P_j$ which did not require the omitted bus lines to be either read or written to could be added.

Each read line is connected to the RESET input of latch 49 through a tri-state buffer 66. The control inputs of tri-state buffers 66 are connected to even numbered clock lines 33. That is, the control input of the tri-state buffer on read line $I_1$ is connected to clock line $\Phi_2$, the control input of the tri-state buffer on read line $I_2$ is connected to clock line $\Phi_4$, the control input of the tri-state buffer on read line $I_n$ is connected to clock line $\Phi_2$, and so on. It can be seen that if an input $I_n$ in a module $M_j$ is connected to a bus line which has a logic level of 1 and, at the same time, clock line $\Phi_{2i}$ (where i is an integer) has a logic level of 1, then latch 49 will be reset. When latch 49 is reset the ACTIVE flag for module $M_j$ is set off and module $M_j$ takes no further part in the arbitration.

As discussed above, $N_B(K,n)$ is the maximum number of competing modules that can be handled in n units of time on an arbitration bus of width K bits in a bus system in which priority codes are assigned to modules from the set B(K,n). $L_B(K,n)$ is the total number of write lines 42 which are connected to the same bus line 24. It can be shown that:

$$L_B(K,n) = \sum_{q=0}^{n-1} \binom{K-1}{q} = N_B(K-1, n-1) \quad (12)$$

Since $N_b(K-1,n-1)<(n/K)N_b(K,n)$, and n/K is a fraction which is smaller than 1, the method of the invention requires the connection of a smaller number of modules to each bus line (i.e. the method provides less bus loading) than many prior art methods.

Table 4 lists $L_B$ for various values of K and n. It can be seen that bus loading can be reduced by increasing K, by decreasing n, or by both increasing K and decreasing n. In general it is desirable to reduce $L_B$ because decreasing the number of modules connected to the same bus line increases the switching speed of the bus line and speeds the arbitration.

Table 4 also shows the arbitration time and the number of logic units required for each scheme. The arbitration time is proportional to n. The number of elementary components (i.e. logic components that process only a single bit of data at a time) in the arbitration logic per module is also proportional to n. It can be seen that faster arbitration circuits require fewer logic components per module. The cost of achieving faster arbitration in this case is a wider bus which implies a larger prefix-OR unit 25. However the system requires only one prefix-OR unit 25 and prefix-OR unit 25 has a simple function which can be easily expanded and optimized.

TABLE 4

| Code Set | N | m | $L_B$ | Arbitration Time | Logic Per Module |
|---|---|---|---|---|---|
| B(4,2) | 11 | 4 | 4 | 2 | 4 |
| B(5,2) | 16 | 5 | 5 | 2 | 4 |
| B(6,2) | 22 | 6 | 6 | 2 | 4 |
| B(6,3) | 42 | 6 | 16 | 3 | 4 |
| B(7,2) | 29 | 7 | 7 | 2 | 4 |
| B(7,3) | 64 | 7 | 22 | 3 | 6 |
| B(8,2) | 37 | 8 | 8 | 2 | 4 |
| B(8,3) | 93 | 8 | 29 | 3 | 6 |
| B(8,4) | 163 | 8 | 64 | 4 | 8 |
| B(9,2) | 46 | 9 | 9 | 2 | 2 |
| B(9,3) | 130 | 9 | 37 | 3 | 6 |
| B(9,4) | 256 | 9 | 93 | 4 | 8 |
| B(10,2) | 56 | 10 | 10 | 2 | 4 |
| B(10,3) | 176 | 10 | 46 | 3 | 6 |
| B(10,4) | 386 | 10 | 130 | 4 | 8 |
| B(10,5) | 538 | 10 | 256 | 5 | 10 |
| B(11,2) | 67 | 11 | 11 | 2 | 4 |
| B(11,3) | 232 | 11 | 56 | 3 | 6 |
| B(11,4) | 562 | 11 | 176 | 4 | 8 |
| B(11,5) | 1024 | 11 | 386 | 5 | 10 |

It can be appreciated that each module has a fixed amount of arbitration logic which is independent of the number of modules connected to the bus. The hardware complexity of the arbitration logic per module is dependent only on the priority code assigned to the module. The arbitration logic in all modules is identical. The arbitration logic in the modules differs only in which subset of bus lines each module is connected to. Modules can therefore be designed with a fixed arbitration hardware with a design independent of both the bus-width K and the number N of modules connected to the same arbitration bus. Module priorities can be reprogrammed by simply reconfiguring the connections of the modules to the arbitration bus.

The system can be implemented so that the fan-in (the number of inputs) of any elementary logic gate in the arbitration logic is at most 2 (i.e. all gates have two inputs at the most). The logic that evaluates the priority status of a module can be realized with one level of tri-state switches.

The number of module-to-bus connections is independent of the number of modules connected to the bus.

It can be appreciated that the following tradeoffs can be achieved in arbitration systems according to the invention:

1—Arbitration time can be reduced by increasing bus-width and reducing n while leaving the number of modules constant.

2—Arbitration logic per module can be reduced by increasing bus-width and reducing n while leaving the number of modules constant.

3—The number of modules can be increased indefinitely by increasing only bus-width, but while keeping arbitration time and arbitration logic fixed (i.e. while keeping n fixed).

4—The number of modules connected to each bus line can be reduced by increasing bus-width.

As will be apparent to those skilled in the art in the light of the foregoing disclosure, many alterations and modifications are possible in the practice of this invention without departing from the spirit or scope thereof. By way of example only, the components of the circuits described above may be replaced with functional equivalents, prefix-OR unit 25 may incorporate alternative currently known prefix-OR circuits which meet design criteria and are compatible with the bus being used, or the prefix-OR operation may be implemented by reading bus 23 and writing transformed values to bus lines 24 under software control.

Accordingly, the scope of the invention is to be construed in accordance with the substance defined by the following claims.

What is claimed is:

1. A method for priority arbitration among a plurality of modules in a computer system, said computer system comprising a multi-line arbitration bus comprising K bus lines bus{1}, . . . , bus{k}, said method comprising the steps of:
   a) assigning to each of said modules a priority code $P_j$ from a set $D(r,K+1)$ consisting of r-digit radix K+1 numbers;
   b) causing modules which are contending for access to a system resource to be active;
   c) causing each active module having a priority code with a non-zero first digit, to write a logic value of "1" to a bus line bus{i} corresponding to said first digit;
   d) performing a prefix-OR operation on said arbitration bus; and,
   e) for each active module having a priority code with a first digit having a value i, with i≠K, reading a logic value on a bus line bus{i+1} and making said active module inactive if said logic value on said bus line bus{i+1} is "1".

2. The method of claim 1 wherein said priority codes comprise two or more digits and further comprising iterating said steps (c), (d) and (e) for subsequent digits of said priority codes until only a single module remains in contention.

3. The method of claim 2 wherein said step of performing a prefix-OR operation on said arbitration bus comprises causing each of said active modules having a priority code with a non-zero first digit to write logic values of "1" to said bus line bus{i} and to any bus lines bus{j} where j<i.

4. A computer system comprising:
   a) a wired-OR arbitration bus comprising a plurality of K bus lines;
   b) a plurality of modules each of said modules having a unique priority code, said modules comprising writing circuitry for placing said arbitration bus in a logic state by writing logic values corresponding to said priority codes to said arbitration bus;
   c) circuitry connected to said arbitration bus for modifying said logic state of said arbitration bus by performing a prefix-OR operation on said arbitration bus;
   d) reading circuitry in said modules for determining logic levels on at least one line of said arbitration bus while said arbitration bus is in said modified logic state; and,
   e) logic circuitry in each said modules associated with said reading circuitry for conditionally switching said module into a non-active state in response to logic levels determined by said reading circuitry.

5. The computer system of claim 4 wherein said priority codes are selected from a set consisting of bounded weight codes of length K and maximum weight r.

6. The computer system of claim 4 wherein said priority codes are selected from a set consisting of constant weight codes of length K and weight r.

7. The computer system of claim 4 wherein said priority codes are selected from a set consisting of of r-digit radix K numbers, where r is an integer and r≧1.

8. The computer system of claim 4 wherein said priority codes are selected from a set consisting of r-digit radix K+1 numbers, where r is an integer and r≧1.

9. The computer system of claim 8 wherein said plurality of modules each comprise r registers, each of said registers comprising K bits, and said priority codes are stored in said registers.

10. The computer system of claim 9 wherein in each of said plurality of modules, each digit of said priority code is stored in one of said r registers.

11. The computer system of claim 10 wherein each said digit of said priority code is represented as a K-bit unitary code in one of said r registers.

12. The computer system of claim 10 wherein each said digit of said priority code is represented as a K-bit sorted code in one of said r registers.

* * * * *